(12) United States Patent　　(10) Patent No.:　US 12,668,194 B1

Sutliff　　(45) Date of Patent:　Jun. 30, 2026

(54) MODULAR RACK SYSTEM FOR A PICKUP TRUCK

(71) Applicant: Russell Sutliff, Granite Bay, CA (US)

(72) Inventor: Russell Sutliff, Granite Bay, CA (US)

( * ) Notice: Subject to any disclaimer, the term of this patent is extended or adjusted under 35 U.S.C. 154(b) by 0 days.

(21) Appl. No.: 19/542,302

(22) Filed: Feb. 17, 2026

Related U.S. Application Data

(62) Division of application No. 19/296,234, filed on Aug. 11, 2025, now Pat. No. 12,583,393.

(51) Int. Cl.
B60R 9/02 (2006.01)
B62D 33/02 (2006.01)

(52) U.S. Cl.
CPC ............ B60R 9/02 (2013.01); B62D 33/0207 (2013.01)

(58) Field of Classification Search
CPC .... B60R 9/02; B60R 9/08; B60R 9/10; B60R 9/12; B62D 33/0207
USPC ................................ 224/924, 402, 403, 405
See application file for complete search history.

(56) References Cited

U.S. PATENT DOCUMENTS

| | | | | | |
|---|---|---|---|---|---|
| 4,405,170 | A | * | 9/1983 | Raya | B60P 3/42 296/105 |
| 5,002,324 | A | * | 3/1991 | Griffin | B60R 9/00 296/3 |
| 5,137,320 | A | * | 8/1992 | Christensen | B60R 9/00 296/3 |
| 11,433,841 | B2 | * | 9/2022 | Nava Reyes | B60R 21/13 |
| 11,673,458 | B2 | * | 6/2023 | Cruckshank | B60P 7/135 296/3 |
| 12,012,154 | B2 | * | 6/2024 | Cunningham | B62D 33/0207 |
| 2003/0011180 | A1 | * | 1/2003 | Coffman | B60R 21/02 280/748 |
| 2005/0093320 | A1 | * | 5/2005 | Brauer | B62D 33/0207 296/3 |
| 2011/0108590 | A1 | * | 5/2011 | Kennedy | B60R 21/026 224/402 |

* cited by examiner

*Primary Examiner* — Scott T McNurlen

(74) *Attorney, Agent, or Firm* — Craig A. Simmermon

(57)　　　　ABSTRACT

Modular rack system for a pickup truck is a modular rack system that is attachable to the bed of a pickup truck with a bed shell, bed cap, or tonneau cover installed. Modular rack system mounts to the side of the pickup truck bed in order to provide full-time access to the truck bed and clearance for the bed shell, bed cap, or tonneau cover. Modular rack system can be installed on the right side, left side, or both sides of a pickup truck. Modular rack system can be installed on a "naked" pickup truck bed or a pickup truck bed with a bed shell, bed cap, or tonneau cover installed thereon. Modular rack system includes a base plate assembly that can receive any number of special adaptor plates that are made to mate with and secure any item you want loaded onto the rack system.

1 Claim, 14 Drawing Sheets

MODULAR RACK SYSTEM FOR A PICKUP TRUCK

CROSS-REFERENCE TO RELATED APPLICATIONS

The instant application is a continuation-in-part of U.S. application Ser. No. 19/073,520 entitled "MODULAR RACK SYSTEM FOR A PICKUP TRUCK" filed on Mar. 7, 2025, which is hereby incorporated by reference herein.

BACKGROUND OF THE INVENTION

1. Field of the Invention

This invention relates to a modular rack system for a pickup truck and specifically to a modular rack system that is reversibly attachable to the bed of a pickup truck that may also have a bed shell, bed cap, or tonneau cover installed thereon. The modular rack system of this invention sets off to the side of the pickup truck bed like a saddle bag in order to provide full-time access to the truck bed and also provide clearance for the bed shell, bed cap, or tonneau cover. The modular rack system of this invention can be installed on the right side, the left side, or both sides of a pickup truck. The modular rack system of this invention can be installed on a "naked" pickup truck bed or a pickup truck bed with a bed shell, bed cap, or tonneau cover installed thereon. The modular rack system of this invention can hold just about anything including: a bicycle, snow boards, surf boards, skis, tool boxes, a saw table, power tools, a work bench, a vice bench, a wench to lift heavy items onto the rack system, an electric bike, a motorcycle, and/or anything else that is desired. The modular rack system includes a base plate assembly that can receive any number of special adaptor plates that can be used to secure any desired item you want loaded and stowed onto the rack system.

A bed shell or bed cap is defined as follows. A bed shell, also known as, a cap, canopy, topper, pap cap, truck cap, bed cap, box cap, or camper shell is a small housing or rigid canopy used as a pickup truck accessory. The housing is usually made of fiberglass or aluminum, but sometimes wood or canvas, and is mounted on top of the pickup truck's rear bed. The shell usually covers the entire bed of the pickup truck, and is large enough to be used for camping purposes. The top of the shell is usually even with or above the top of the pickup truck cab. Even though its initial purpose was use for camping, shells are now most often used for utility, storage purposes, and to protect bed cargo from the elements and theft. The year and model of the pickup truck determine the size and/or model of bed shell or bed cap that properly fits the pickup truck.

A tonneau cover is defined as follows. A tonneau cover is a cover for a pickup truck bed. A tonneau cover is a hard or soft cover that spans the back of a pickup truck to protect the load from weather elements, thieves, and/or to improve aerodynamics. Tonneau covers come in many styles that fold, retract, or tilt open, and can be locked shut. Common materials used include steel, aluminum, canvas, PVC, fiberglass, and carbon fiber. Modern hard tonneau covers open by a hinging or folding mechanism, while segmented or soft covers open by rolling back or folding back. The year and model of the pickup truck determine the size and/or model of tonneau cover that properly fits the pickup truck.

2. Description of Related Art

There are other modular rack systems for a pickup truck in the prior art. However, there are none with a base plate assembly as shown and described here that includes a base plate pivotally attached to a hinge plate wherein the base plate can be clamped onto the sidewall of a pickup truck bed, underneath the bed shell, bed cap, or tonneau cover in order to yield exceptionally strong and stable mounting of the multi-sport rack. The special shape and design of the base plate assembly and the clamping mechanisms are exceptionally strong and rigid which allows the modular rack system and its cargo to remain steady and free from vibrations at all times and during travel.

BRIEF SUMMARY OF THE INVENTION

It is an aspect of modular rack system for a pickup truck to be reversibly attachable to the naked bed of a pickup truck.

It is an aspect of modular rack system for a pickup truck to be reversibly attachable to the bed of a pickup truck with a bed shell, bed cap, or tonneau cover installed onto the bed of the pickup truck.

It is an aspect of modular rack system for a pickup truck to include a special base plate assembly that can be clamped underneath the bed the bed shell, bed cap, or tonneau cover and the bed of the pickup truck to yield a sturdy mount for the multi-sport rack.

It is an aspect of special base plate assembly to include a top plate, a side plate, and a bottom plate.

It is an aspect of special base plate assembly to include a base plate clamp bracket.

It is an aspect of special base plate assembly to include a base plate mounting flange.

It is an aspect of modular rack system for a pickup truck to include a T-bracket with a first and second T-bracket clamp.

It is an aspect of modular rack system for a pickup truck to include a front and rear stanchion assembly, each with a ratcheting tire clamp to attach and retain the bicycle.

It is an aspect of modular rack system for a pickup truck to include a first and second harp member that are used to retain snow boards, surf boards, and/or skis.

It is an aspect of modular rack system for a pickup truck to include a diagonal strap that is used to rigidly hold special base plate assembly to the pickup truck bed.

It is an aspect of modular rack system for a pickup truck to include board and ski webbing that are used to retain snow boards, surf boards, and/or skis.

DEFINITION LIST

Figure 1:
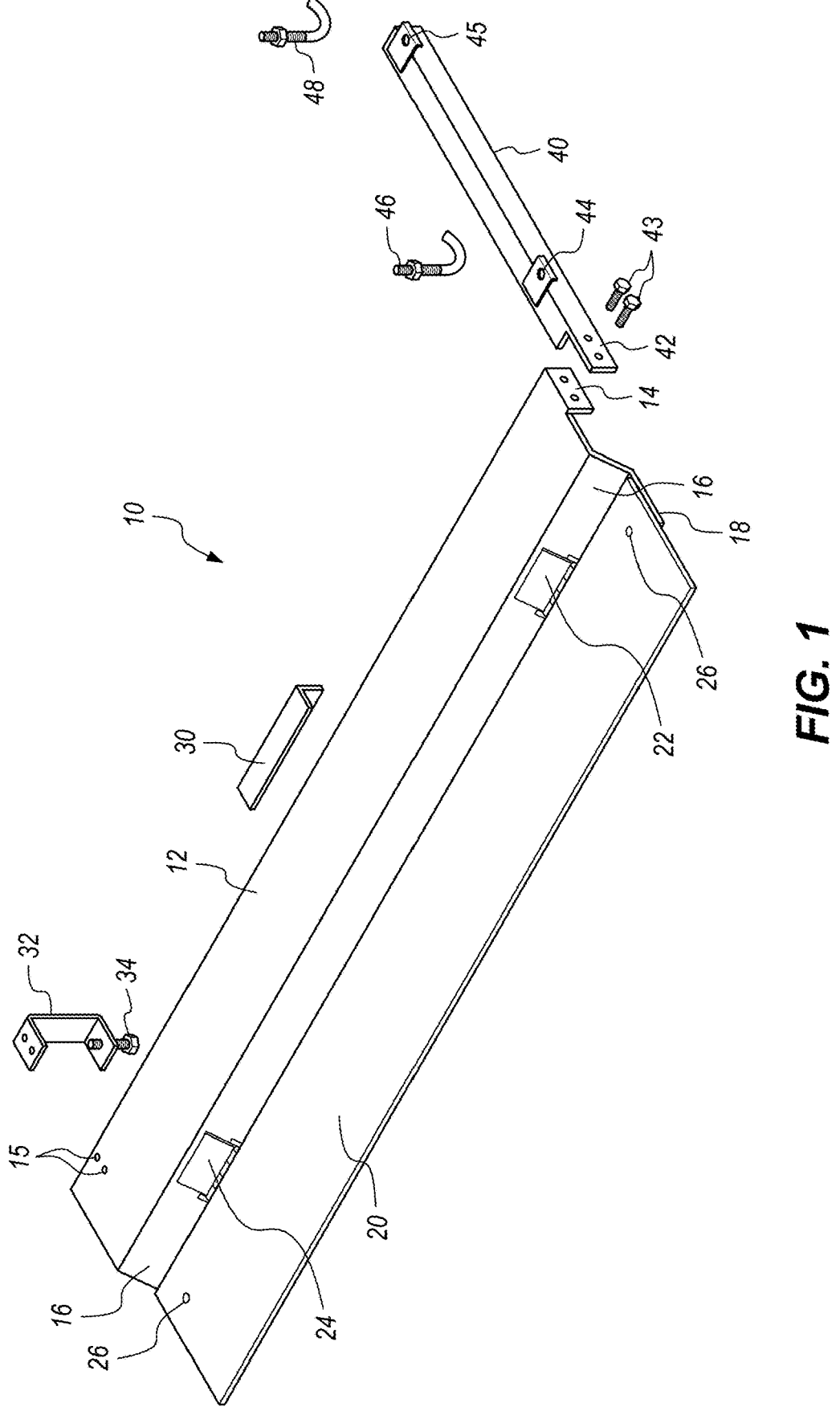
FIG. 1 is an assembly view of base plate assembly, T-bracket, base plate clamp bracket, first J-bolt, and second J-bolt.
Figure 2:
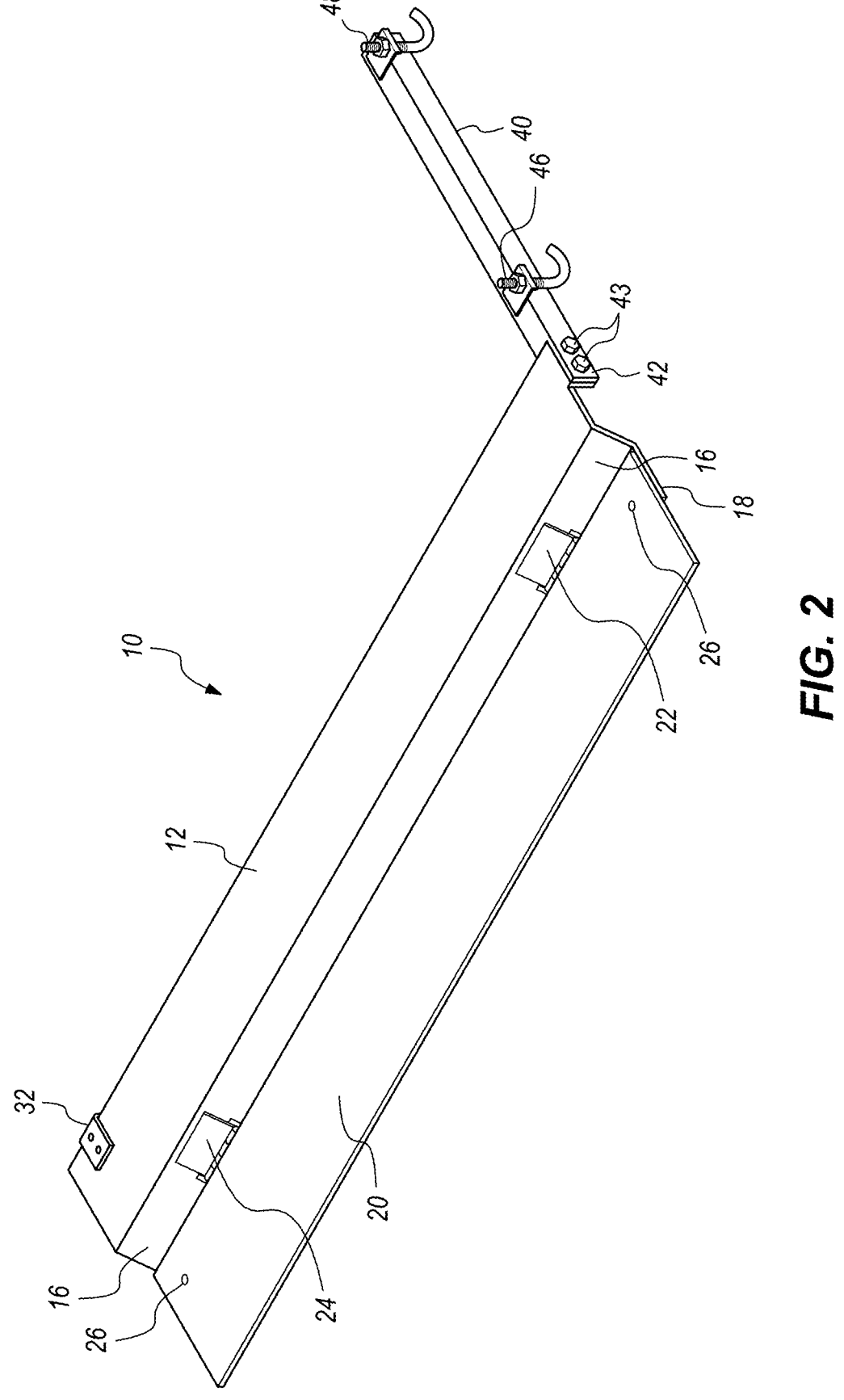
FIG. 2 is an outer perspective view of base plate assembly, T-bracket, base plate clamp bracket, first J-bolt, and second J-bolt.
Figure 3:
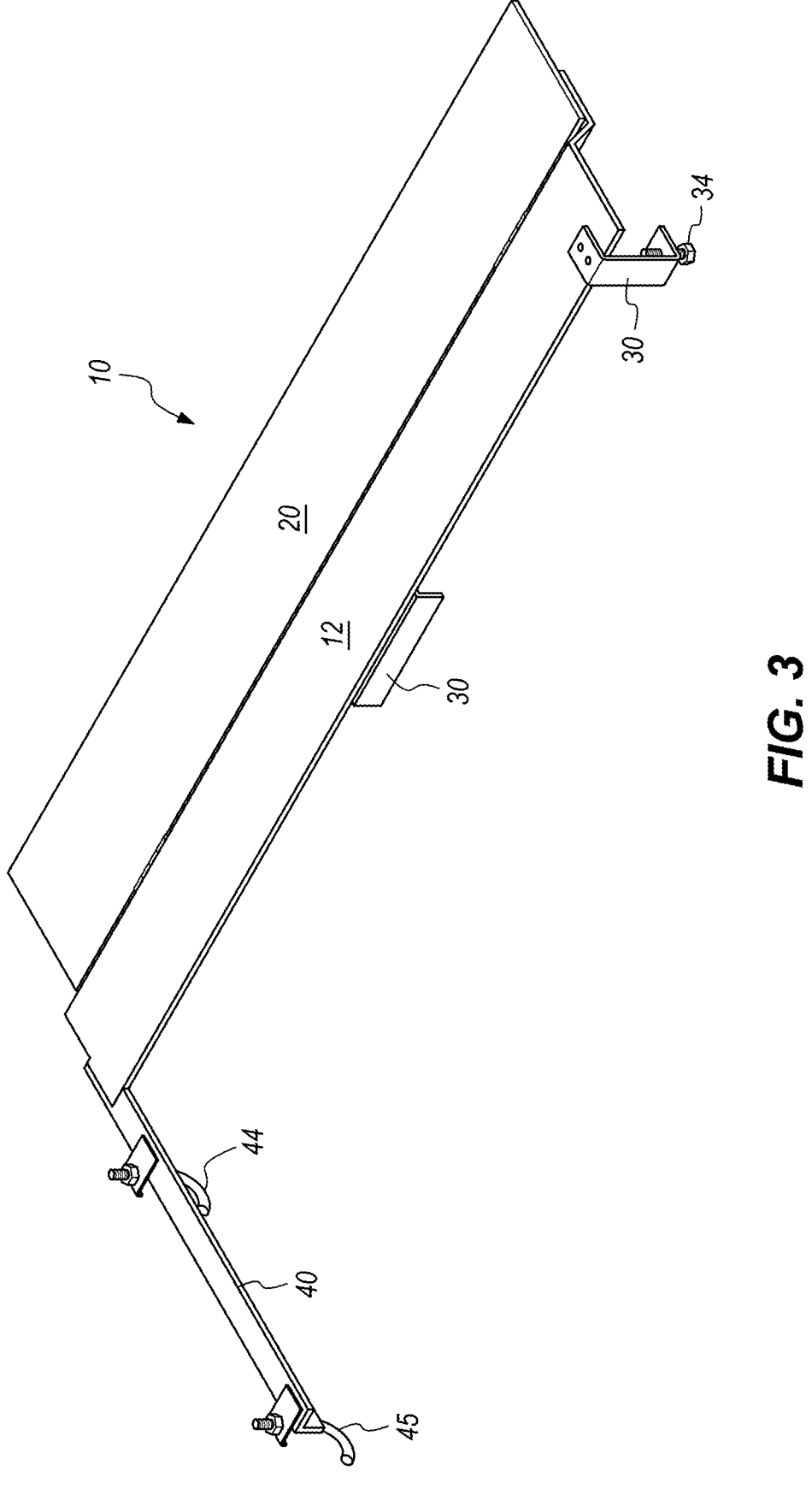
FIG. 3 is an inner perspective view of base plate assembly, T-bracket, base plate clamp bracket, first J-bolt, and second J-bolt.

| Term | Definition |
| --- | --- |
| 5 | Modular Rack System for a Pickup Truck |
| 10 | Base Plate Assembly |
| 12 | Top Plate |
| 14 | T-Bracket Mounting Flange |
| 15 | Base Plate Clamp Bracket Mounting Hole |
| 16 | Side Plate |
| 18 | Bottom Plate |
| 20 | Hinge Plate |
| 22 | Front Hinge |
| 24 | Rear Hinge |
| 26 | Adaptor Plate Mounting Hole |
| 28 | Locking Tab Mounting Hole |
| 30 | Inside Wall Locating Flange |
| 32 | Base Plate Clamp Bracket |
| 34 | Base Plate Clamp Bracket Bolt or Screw |
| 36 | Stake Pocket Toggle Bolt |
| 40 | T-Bracket |
| 42 | Base Plate Mounting Flange |
| 43 | Base Plate Mounting Bolt |
| 44 | First T-Bracket Clamp Tab |
| 45 | Second T-Bracket Clamp Tab |
| 46 | First J-Bolt |
| 48 | Second J-Bolt |
| 50 | Flat Adaptor Plate |
| 52 | Hinge Plate Mounting Hole on Flat Adaptor Plate |
| 54 | Flat Adaptor Plate Fastener |
| 60 | Muli-Sport Rack or Bike Rack |
| 62 | Inner Base Rail |
| 63 | Outer Base Rail |
| 64 | Front Stanchion Assembly |

-continued

| Term | Definition |
| --- | --- |
| 65 | Front Ratcheting Tire Clamp |
| 66 | Rear Stanchion Assembly |
| 67 | Rear Ratcheting Tire Clamp |
| 68 | Bike Rack Fastener |
| 69 | Bike Rack Nut |
| 70 | Channeled Adaptor Plate |
| 72 | C-Channel on Channeled Adaptor Plate |
| 74 | Hinge Plate Mounting Hole on Channeled Adaptor Plate |
| 76 | Channeled Adaptor Plate Fastener |
| 78 | Locking Tab Mounting Hole on Channeled Adaptor Plate |
| 80 | Tool Box, Tool, or Workbench |
| 82 | Mounting Ear on Tool Box, Tool, or Workbench |
| 84 | Locking Tab on Tool Box, Tool, or Workbench |
| 86 | Channeled Adaptor Plate Locking Tab Hole |
| 88 | Mounting Bolt or Pad Lock for Tool Box, Tool, or Workbench |
| 90 | Channeled Top Plate |
| 92 | C-Channel on Channeled Top Plate |
| 94 | Hinge Plate Mounting Hole on Channeled Top Plate |
| 96 | Locking Tab Mounting Hole on Channeled Top |
| 100 | Stanchion |
| 112 | Stanchion Brace |
| 200 | Pickup Truck |
| 202 | Pickup Truck Bed |
| 204 | Stake Pocket on Pickup Truck Bed |

DETAILED DESCRIPTION OF THE INVENTION

Modular rack system for a pickup truck 5 is a multi-sport rack that is rigidly reversibly attachable to a pickup truck bed 202 that also has a bed shell, bed cap, or tonneau cover installed thereon. Modular rack system for a pickup truck 5 is also rigidly reversibly attachable to a naked pickup truck bed 202 without a bed shell, bed cap, or tonneau cover installed thereon. Modular rack system for a pickup truck 5 has a special base plate assembly 10 that is clamped to and rigidly attached to the top of a sidewall of a pickup truck bed 202. If the bed has a bed shell, bed cap, or tonneau cover, then modular rack system for a pickup truck 5 is attached in between the pickup truck bed 202 and the bed shell, bed cap, or tonneau cover. In all cases, the modular rack system for a pickup truck 5 is tightly clamped down to yield very strong and rigid attachment of the modular rack system 5 to the pickup truck 200.

Modular rack system for a pickup truck 5 comprises: a base plate assembly 10.

Base plate assembly 10 is a custom shaped rigid plate assembly. Base plate assembly 10 has a complex shape that was designed to yield high strength and rigidity in order to provide solid and stable attachment of cargo to the modular rack system 5 and solid and stable attachment of the modular rack system 5 to the pickup truck 200. The lower portion of base plate assembly 10 is reversibly rigidly attachable to a pickup truck bed 202 to yield a super rigid structure that keeps the modular rack system 5 and its cargo steady and free from vibrations during travel.

This rack system 5 is modular because the base plate assembly May receive and rigidly connect to any adaptor plate, wherein adaptor plates may may be designed or customized to receive and rigidly connect to virtually any item that is desired. The upper portion of base plate assembly 10 is reversibly rigidly attachable to any adaptor plate which in turn is reversibly rigidly attachable to any item, rack, or tool. Adaptor plates are specially designed or customized to receive and hold specific cargo items like: a bicycle rack, snow board rack, surf board rack, ski rack, tool box, a saw table, power tool, a work bench, a vice bench, a wench, an electric bike, a motorcycle, a large bin, or virtually anything else. The base plate assembly 10 is designed to receive and rigidly attach to all adaptor plates. Each adaptor plates has one or more mounting holes that align with one or more mounting holes on the hinge plate 20.

Base plate assembly 10 comprises: a top plate 12; a side plate 16; a bottom plate 18; a hinge plate 20; a front hinge 22; and a rear hinge 24. Top plate 12, side plate 16, a bottom plate 18, and hinge plate 20 are connected together to yield the base plate assembly 10. As discussed below, top plate 12, side plate 16, and bottom plate 18 may comprise individual sheets of material that are attached together or may be stamped or forged from one sheet of material. Any known method of fabrication may be used to construct the specific rigid shape of base plate assembly 10 which is defined as follows.

Please note that throughout this writing, front or front-wards references the end or direction that is adjacent to the front of the pickup truck 200 that the modular rack system 5 is attached to. Likewise, rear or rearwards references the end or direction that is adjacent to the rear of the pickup truck 200. Inner or inside references the end or direction that is adjacent to the pickup truck 200. Outer or outside references the end or direction that is not adjacent to or opposite to the pickup truck 200.

Top plate 12 is a solid rigid rectangular member. Top plate 12 is a rigid rectangular horizontal planar member or sheet of material with a plane, a front edge, a rear edge, an inner edge, an outer edge, an upper surface, a lower surface, a length, a width, a thickness, a longitudinal axis, and a latitudinal axis. Top plate 12 has a length of about 2-10 feet. Top plate 12 has a width of about 2-24 inches.

If the modular rack system for a pickup truck 5 is installed on a pickup truck 200 with a bed shell, bed cap, or tonneau cover, then the top plate 12 is clamped and sandwiched between the bed shell, bed cap, or tonneau cover and the pickup truck bed 202 with the original equipment clamps that come with the bed shell, bed cap, or tonneau cover. Alternately, in the case of a naked truck bed installation, the top plate 12 is clamped directly to the pickup truck bed 202 using one or more base plate clamp brackets 32 or one or more stake pocket toggle bolts 36, as discussed below. Thus, there are three options to mount top plate 12 to the pickup truck 200: 1) OEM clamps from the bed shell, bed cap, or tonneau cover; 2) one or more base plate clamp brackets 32; or 3) one or more stake pocket toggle bolts 36.

Top plate 12 further comprises: a T-bracket mounting flange 14 and one or more base plate clamp bracket mounting holes 15.

T-bracket mounting flange 14 is a rectangular or square extension or ear projecting downward from the front edge of top plate 12. T-bracket mounting flange 14 is located on the front edge of top plate 12 adjacent to the inner edge of top plate 12, as depicted. T-bracket mounting flange 14 has an upper edge, a lower edge, an inner edge, an outer edge, a front surface, a rear surface, a plane, a length, a width, and a thickness. T-bracket mounting flange 14 has at least one hole therethrough, which receives one or more base plate mounting bolts 43, as discussed below. The upper edge of T-bracket mounting flange 14 is rigidly attached to the front edge of top plate 12 to form a right angle there between. The plane of T-bracket mounting flange 14 is perpendicular with the plane of top plate 12. In best mode, T-bracket mounting flange 14 is integral with top plate 12 and made from the same piece of material. T-bracket mounting flange 14 has one or more mounting holes as depicted which are used to mount T-Bracket 40 as discussed below. In best mode, each one or more mounting hole on T-bracket mounting flange 14 is a tapped hole that engages with a base plate mounting bolt 43. In an alternate mode, each one or more mounting hole on T-bracket mounting flange 14 engages with the head on each base plate mounting bolt 43 so that the head on base plate mounting bolt 43 is held in place and does not rotate when a nut is tightened on the threaded end of base plate mounting bolt 43.

Each one or more base plate clamp bracket mounting holes 15 is a is a circular hole or slotted hole through the top plate 12 at a location towards rear edge of top plate 12. Each one or more base plate clamp bracket mounting holes 15 has a longitudinal axis that is perpendicular to that of top plate 12. Each one or more base plate clamp bracket mounting holes 15 functions as a mounting hole for the optional base plate clamp bracket 32, as discussed below.

Side plate 16 is a rigid rectangular planar member or sheet of material with a plane, a front edge, a rear edge, an inner edge, an outer edge, an upper surface, a lower surface, a length, a width, a thickness, a longitudinal axis, and a latitudinal axis. Side plate 16 is rigidly attached to the top plate 12 and the bottom plate 18. Side plate 16 is a diagonal member that lies on a diagonal plane. The length of side plate 16 is equal to that of top plate 12. The width of side plate 16 is about 2-20 inches.

Bottom plate 18 is a rigid planar horizontal member or sheet of material with a plane, a front edge, a rear edge, an inner edge, an outer edge, an upper surface, a lower surface, a length, a width, a thickness, a longitudinal axis, and a latitudinal axis. Bottom plate 18 is rigidly attached to the side plate 16. Bottom plate 18 is a horizontal member. The length of bottom plate 18 is equal to that of top plate 12. The width of bottom plate 18 is about 2-24 inches.

Top plate 12, side plate 16, and bottom plate 18 are connected together in the following way to form the major-ity of base plate assembly 10. The longitudinal axes of the top plate 12, side plate 16, and bottom plate 18 are parallel. The plane of top plate 12 is parallel with the plane of bottom plate 18. The outer edge of top plate 12 is joined with or rigidly attached to the inner edge of side plate 16. The plane of top plate 12 meets the plane of side plate 16 at an angle that is greater than 180 degrees and less than 270 degrees. The lower surface of top plate 12 and the lower surface of side plate 16 form an angle that is greater than 90 degrees and less than 180 degrees. The upper surface of top plate 12 and the upper surface of side plate 16 form an angle that is greater than 180 degrees and less than 270 degrees. The outer edge of side plate 16 is joined with or rigidly attached to the inner edge of bottom plate 18. The front edge of top plate 12 is aligned with and even with the front edge of side plate 16 and the front edge of bottom plate 18. The rear edge of top plate 12 is aligned with and even with the rear edge of side plate 16 and the rear edge of bottom plate 18. In best mode, the corner between the front edge and outer edge of bottom plate 18 is diagonal cut to yield a shaved corner or more rounded corner.

The rigid attachment of plates 12, 16, 18 may be accomplished by any known means such as: brake bending, die press bending, pressed seam, weld, solder, glue, epoxy, adhesive, bolts, screws, rivets, clips, snaps, pins, or fasteners. Base plate assembly 10 may be: a one-piece integral structure that was stamped or forged from one piece of material, a multi-piece structure that was attached together to form the shape, or any combination thereof. Base plate assembly 10 may be made of any known material such as: metal, steel, aluminum, polymer, plastic, composite, wood, fiberglass, ceramic, carbon fiber, or combination thereof, or any other known material. In best mode, base plate assembly is a one-piece integral structure. Base plate assembly 10 is the primary source of the substantial rigidity and sturdiness of the modular rack system 5.

Hinge plate 20 is a solid rigid rectangular member. Hinge plate 20 is a rigid rectangular horizontal planar member or sheet of material with a plane, a front edge, a rear edge, an inner edge, an outer edge, an upper surface, a lower surface, a length, a width, a thickness, a longitudinal axis, and a latitudinal axis. Hinge plate 20 has a length of about 2-10 feet. Hinge plate 20 has a width of about 2-24 inches. As detailed below, the hinge plate 20 is pivotally attached to the side plate 16 or the bottom plate 18. Pivotal attachment is accomplished by front hinge 22 and rear hinge 24. Front hinge 22 is a mechanical bearing that pivotally connects hinge plate 20 to side plate 16 or bottom plate 18 to allow them to rotate relative to each other about a fixed axis of rotation, with all other translations or rotations prevented. Rear hinge 24 is a mechanical bearing that pivotally connects hinge plate 20 to side plate 16 or bottom plate 18 to allow them to rotate relative to each other about a fixed axis of rotation, with all other translations or rotations prevented. In best mode, front hinge 22 and rear hinge 24 are identical. Front hinge 22 and rear hinge 24 each have a first leaf, a second leaf, and a hinge pin. The first leaf of front hinge 22 and rear hinge 24 is rigidly attached to the side plate 16 or the bottom plate 18. The second leaf of front hinge 22 and rear hinge 24 is rigidly attached to the hinge plate 20. The hinge pin is pivotally attached to both the first leaf and the second leaf front hinge 22 and rear hinge 24 to yield a pivotal attachment between the hinge plate 20 and the side plate 16 or the bottom plate 18. It makes little difference whether the first leaf of each hinge is attached to the bottom plate 18 or the side plate 16. In the drawings, the first leaf of each hinge is rigidly attached to the side plate 16. However, it would be just as effective for the first leaf of each hinge to be rigidly attached to the bottom plate 18. In either case, the lower surface of the hinge plate 20 rests on the upper surface of the bottom plate 18 when the hinge plate 20 is extended or lowered, and the upper surface of hinge plate 20 rests on the upper surface of side plate 16 when the hinge plate 20 is retracted or raised. When the hinge plate 20 is raised, its plane is essentially parallel with that of side plate 16. When the hinge plate 20 is lowered, its plane is essentially parallel with that of bottom plate 18. Any known type of hinge may be used for front hinge 22 and rear hinge 24.

Figure 4A:
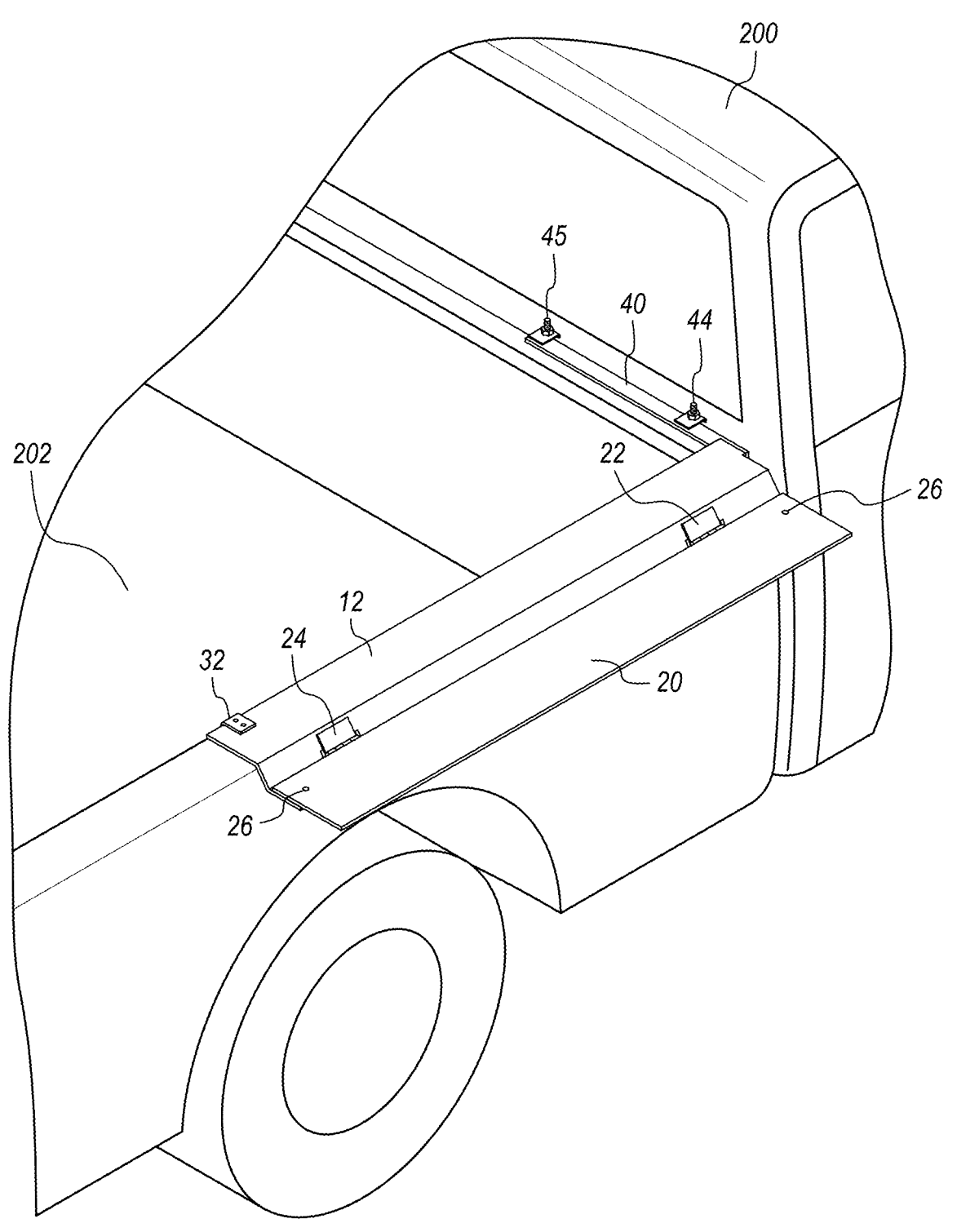
FIG. 4A is a perspective view of base plate assembly, T-bracket, base plate clamp bracket, first J-bolt, and second J-bolt attached to a pickup truck bed with the hinge plate extended or lowered.
Figure 4B:
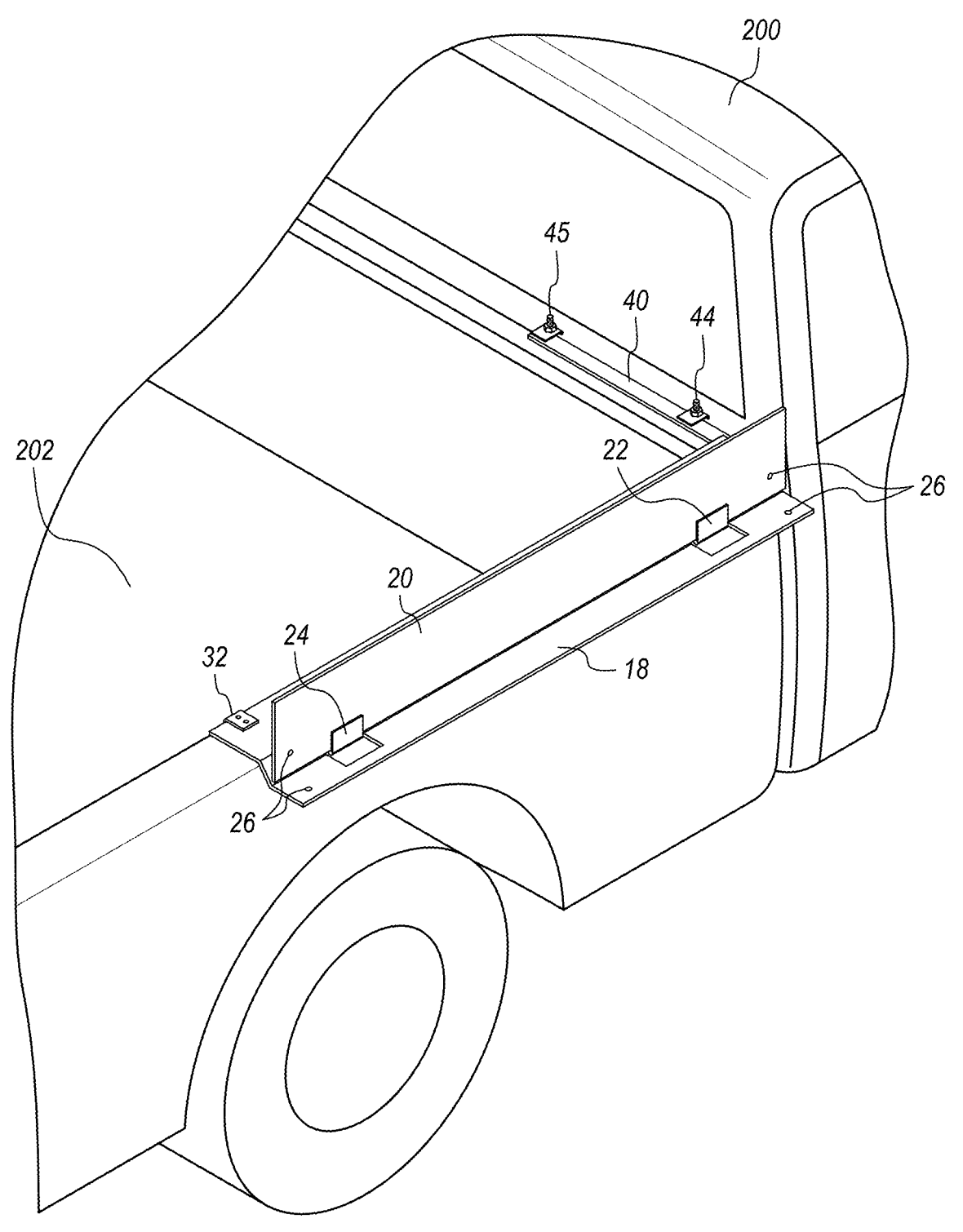
FIG. 4B is a perspective view of base plate assembly, T-bracket, base plate clamp bracket, first J-bolt, and second J-bolt attached to a pickup truck bed with the hinge plate retracted or raised.

Importantly, hinge plate 20 is designed to raise up, flip up, or retract in order to get out of the way when the modular rack system for a pickup truck 5 is not in use. When the pickup truck 200 is parked and the modular rack system for a pickup truck 5 is not in use carrying cargo, the hinge plate 20 may sometimes get in the way of people walking around the pickup truck 200 or people walking near the pickup truck 200. This flip-up feature is a safety feature and the flip-up feature is very desirable among users of the modular rack system for a pickup truck 5. FIG. 4A depicts the hinge plate 20 extended or lowered. FIG. 4B depicts the hinge plate retracted or raised.

Hinge plate 20 further comprises: one or more adaptor plate mounting holes 26. Each one or more adaptor plate mounting holes 26 is a is a circular hole or slotted hole through the hinge plate 20. In best mode, there is one adaptor plate mounting hole 26 adjacent to the rear edge of hinge plate 20 and a second adaptor plate mounting hole 26 adjacent to the front edge of hinge plate 20. Each one or more adaptor plate mounting holes 26 has a longitudinal axis that is perpendicular to that of hinge plate 20. Each one or more adaptor plate mounting holes 26 functions as a mounting hole for a flat adaptor plate or a channeled adaptor plate 70, as discussed below.

Hinge plate 20 further comprises: one or more locking tab mounting holes 28. Each one or more locking tab mounting holes 28 is a is a circular hole or slotted hole through the hinge plate 20. Each one or more locking tab mounting holes 28 has a longitudinal axis that is perpendicular to that of hinge plate 20. Each one or more locking tab mounting holes 28 functions as a mounting hole for a locking tab 84, as discussed below.

Modular rack system for a pickup truck 5 is modular, i.e. it is capable of being assembled from various and different modules for maximum versatility. As discussed below, a specific adaptor plate can be reversibly rigidly attached to the hinge plate 20 and the adaptor plate can also be reversibly rigidly attached to a specific cargo item, so that the cargo item may be rigidly mounted to the base plate assembly 10. Thus, an adaptor plate may be customized to attach to a specific cargo item or to engage with a specific cargo item, wherein the adaptor plate can also be easily attached to the hinge plate 20. Thus, this modular system allows for any number of adaptor plates that are capable of mounting to any number of cargo items to be easily rigidly attached to the base plate assembly 10 as discussed below.

Base plate assembly 10 further comprises an inside wall locating flange 30. Inside wall locating flange 30 is an oblong rigid planar member or bi-planar member that is rigidly attached to the lower surface of top plate 12, as depicted. Inside wall locating flange 30 has a tab, flap, or projection that extends perpendicularly downward from the lower surface of top plate 12 as depicted. The tab, flap, or projection has: a length, a width, a thickness, an inner surface, an outer surface, a front edge, a rear edge, an upper edge, a lower edge, a longitudinal axis, and a plane. This tab, flap, or projection is rigidly attached to the lower surface of top plate 12, adjacent to the front edge of top plate 12 so that: 1) the longitudinal axis of the tab, flap, or projection is parallel with the inner edge of top plate 12; 2) the plane of the tab, flap, or projection is perpendicular to that of top plate 12; and 3) the inner surface of the tab, flap, or projection is flush with the inner edge of top plate 12. This tab, flap, or projection functions to help align and locate the whole base plate assembly 10 properly onto the pickup truck bed 102 where the outside surface of the tab, flap, or projection is pressed and held against the inside wall of the pickup truck ped 202 and then the base plate clamp bracket 32 is attached as described in detail below. The inside wall locating flange 30 also functions to help retain the base plate assembly 10 onto the pickup truck bed 202 and prevent the base plate assembly 10 from sliding off the pickup truck bed 202 during use. In best mode, inside wall locating flange 30 is a length of angle iron or angle steel as depicted wherein one planar member of the angle iron acts as the tab, flap, or projection and the other planar member of the angle iron is a mounting flange that is used to weld or otherwise rigidly attach to the inside wall locating flange 30 to top plate 12. Thus, the length of angle iron or steel is a bi-planar member.

In some embodiments, modular rack system for a pickup truck 5 further comprises: one or more base plate clamp brackets 32. Each base plate clamp bracket 32 is essentially a C-clamp that has been rigidly attached to top plate 12. Base plate clamp bracket 32 has a rigid C-shaped frame with an upper end and a lower end. The upper end of the C-shaped frame is rigidly attached to the upper surface of the top plate 12, adjacent to the rear edge of top plate 12. The lower end of the C-shaped frame is fitted with a base plate clamp bracket bolt or screw 34. Base plate clamp bracket bolt or screw 34 is a male threaded member that engages with a female thread on the lower end of base plate clamp bracket 32. Base plate clamp bracket bolt or screw 34 is tightened in order to clamp onto the pickup truck bed 202 and loosened in order to release from the pickup truck bed 202. One or more base plate clamp brackets 32 function to clamp and rigidly attach top plate 12 to the sidewall of a pickup truck bed 202.

In some embodiments, modular rack system for a pickup truck 5 further comprises: one or more stake pocket toggle bolts 36. Each stake pocket toggle bolt 36 is a butterfly anchor or bolt with wings that open up as the bolt is tightened to expand and make contact with the back of the hollow wall or hole and apply resistance to allow for the bolt to be tightened and secure an item to the hole. Each stake pocket toggle bolt 36 is a toggle bolt in the common definition of the term. A stake pocket 204 is a rectangular or square hole in the upper surface of a pickup truck bed sidewall. A stake pocket 204 is used to insert a post or stake. Stake pockets 204 are very common and exist on most pickup truck bed sidewalls and are installed by the pickup truck manufacturer. With most or all pickup trucks 200, there are 2-4 stake pockets 204 installed on each side of a pickup truck bed 202. One or more stake pocket toggle bolts 36 function to clamp and rigidly attach top plate 12 to the sidewall of a pickup truck bed 202. Any known type of toggle bolt may be used as long as the butterflies or anchors of the toggle bolt are long enough to catch on the inside of the stake pocket 204.

Modular rack system for a pickup truck 5 further comprises: a T-bracket 40; one or more base plate mounting bolts 43; a first J-bolt 46; and a second J-bolt 48.

T-bracket 40 is a length of angle iron or angle steel. T-bracket 40 is a length of rigid biplanar angular material where the two planes meet at a ninety-degree angle. T-bracket 40 has a rigid horizontal planar member with a length, a width, a height, a longitudinal axis, an inside end, an outside end, an upper surface, a lower surface, a front surface, and a rear surface. T-bracket 40 has a rigid vertical planar member with a length, a width, a height, a longitudinal axis, an inside end, an outside end, an upper surface, a lower surface, a front surface, and a rear surface. The upper edge of vertical planar member is rigidly connected to the front edge of horizontal planar member at a ninety-degree angle to form the angular shape. The front surface of T-bracket 40 is the vertical planar member. The upper surface of T-bracket 40 is the horizontal planar member. In best mode, vertical planar member and horizontal planar member are integral and made of the same piece of material. The length of T-bracket 40 is about 10-50 inches. The width of T-bracket 40 is about 0.5-8 inches. The height of T-bracket 40 is about 0.5-8 inches.

The outside end of T-bracket 40 has a base plate mounting flange 42. Base plate mounting flange 42 is an extension of vertical planar member beyond the outside edge of horizontal planar member as depicted. Base plate mounting flange 42 is a rectangular or rectangular tab or flange. Base plate mounting flange 42 is a rigid vertical planar member. Base plate mounting flange 42 functions to mate with and rigidly attach to T-bracket mounting flange 14 on top plate 12. Base plate mounting flange 42 has one or more mounting holes as depicted which are used to mount to T-bracket mounting flange 14. One or more base plate mounting bolts 43 are used to accomplish this rigid attachment.

T-bracket 40 further comprises: a first T-bracket clamp tab 44 and a second T-bracket clamp tab 45. First and second T-bracket clamp tabs 44,45, along with first and second J-bolts 46,48, function to rigidly attach T-bracket 40 to the pickup truck bed 202 as discussed below. Each of first and second T-bracket clamp tabs 44,45 is a rigid horizontal planar member with: a length, a width, an upper surface, a lower surface, an inside edge, an outside edge, a front edge, and a rear edge. The lower surface of first and second T-bracket clamp tabs 44,45 is rigidly attached to the upper surface of T-bracket 40. Each of first and second T-bracket clamp tabs 44,45 has a circular hole that breaks through its outside edge as depicted. Each circular hole has a longitudinal axis that is parallel with that of T-bracket 40. The circular holes function as mounting holes or mounting slots for first and second J-bolts 46,48 respectively.

Each of the one of more base plate mounting bolts 43 is a bolt, screw, or fastener that functions to help rigidly attach T-bracket 40 to base plate assembly 10. Each of the one of more base plate mounting bolts 43 has a threaded end and a head. In best mode, the threaded end of each base plate mounting bolt 43 engages with female thread on the T-bracket mounting flange 14. In an alternate mode, the head on each base plate mounting bolt 43 engages with a mounting hole on the T-bracket mounting flange 14 or a mounting hole on the base plate mounting flange 42 so that the head on base plate mounting bolt 43 is held in place and does not rotate when a nut is tightened on the threaded end of base plate mounting bolt 43. Thus, the inside surface of rigid vertical member is rigidly attached to T-bracket mounting flange 14 with base plate mounting bolts 43.

First and second J-bolts 46,48, along with T-bracket clamp tabs 44,45, function to rigidly attach T-bracket 40 to the pickup truck bed 202 as discussed below. Each of first and second J-bolts 46,48 is a solid rigid J-shaped member or J-hook with a male threaded portion on the upper end of the J-shape. Each of first and second J-bolts 46,48 has a nut that engages with the threaded portion on the upper end of the J-shape. Each of first and second J-bolts 46,48 is a J-bolt with nut in the common definitions of the terms. J-bolts 46,48 function to clamp down onto first and second T-bracket clamp tabs 44,45 and the bed wall of the pickup truck bed 202. The nuts on J-bolts 46,48 catch on the holes of first and second T-bracket clamp tabs 44,45 respectively. The J-ends of J-bolts 46,48 catch the outside of the front bed wall of the pickup truck bed 202. When J-bolts 46,48 are tightened, this draws the T-bracket clamp tabs 44,45 downward and the J-ends of J-bolts 46,48 upwards to clamp the T-bracket 40 onto the pickup truck bed 202, as discussed below. Thus, T-bracket 40 is rigidly attached to the front bed wall of the pickup truck bed 202.

The above-described items constitute a base embodiment of modular rack system for a pickup truck 5. This base embodiment is depicted in FIGS. 1-4B. Anything may be rigidly attached to the base embodiment using one of any number of different types of adaptor plates. An adaptor plate is reversibly rigidly attachable to the hinge plate 20 wherein anything under the sun may be rigidly attached to the adaptor plate. Adaptor plates may be custom made to mesh with or mate with any specific cargo item. An adaptor plate is a fixture to hold any cargo item, such as a bicycle rack, snow board rack, surf board rack, ski rack, tool box, a saw table, power tool, a work bench, a vice bench, a wench, an electric bike, a motorcycle, a large bin, or virtually anything else.

One or more adaptor plates are used to mount or stow any type of cargo on the modular rack system for a pickup truck 5. Each adaptor plate is reversibly rigidly attachable to the hinge plate 20. The cargo is reversibly rigidly attachable to the adaptor plate. In this way, adaptor plates can be specifically designed and manufactured, or customized after manufacture, to easily connect with and rigidly hold a particular item, wherein the adaptor plate is in turn easily reversibly rigidly attachable to the hinge plate 20. The most basic type of adaptor plate is a flat adaptor plate 50.

Figure 5A:
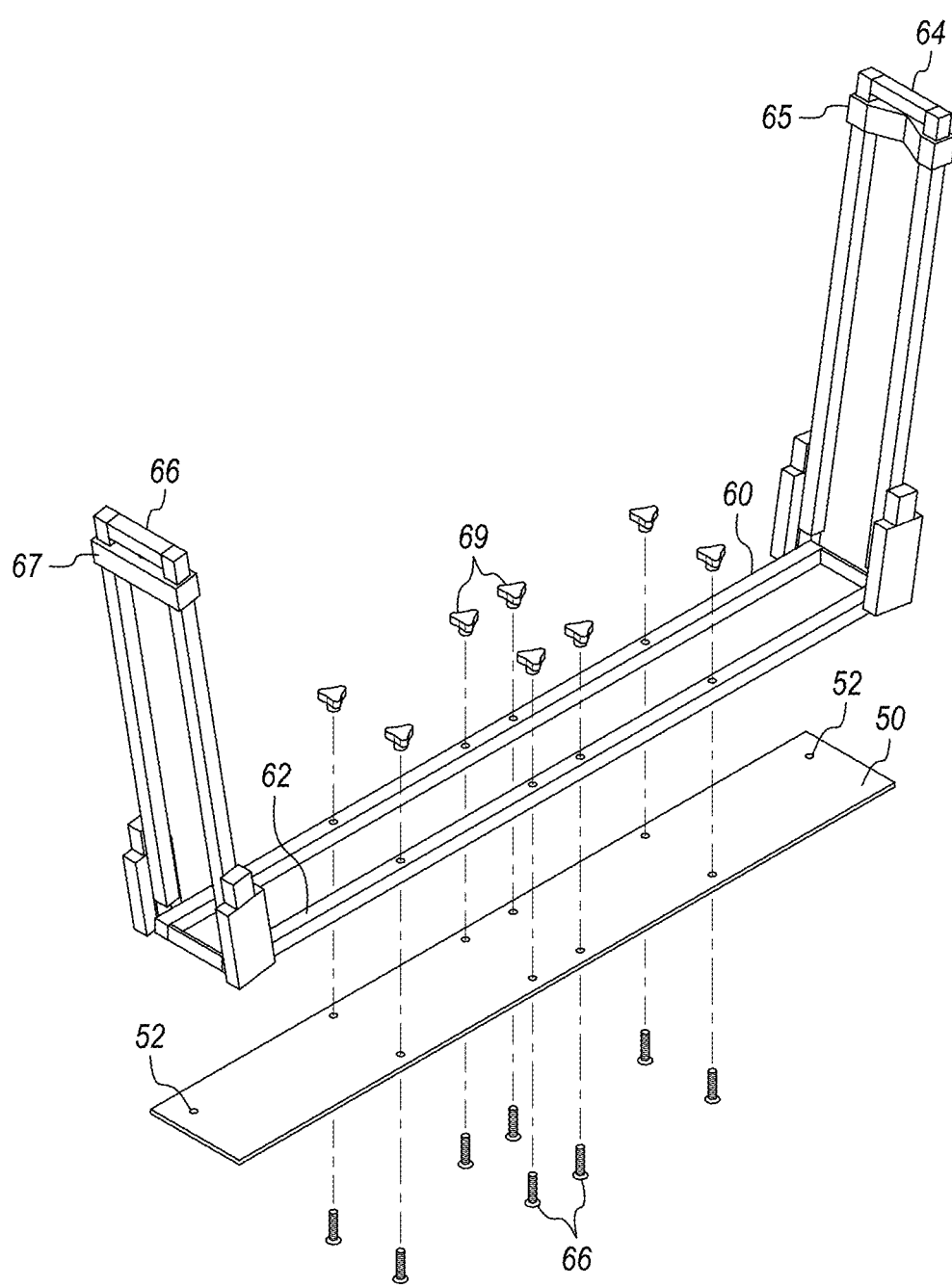
FIG. 5A is an assembly view of multi-sport rack or bike rack and flat adaptor plate.
Figure 5B:
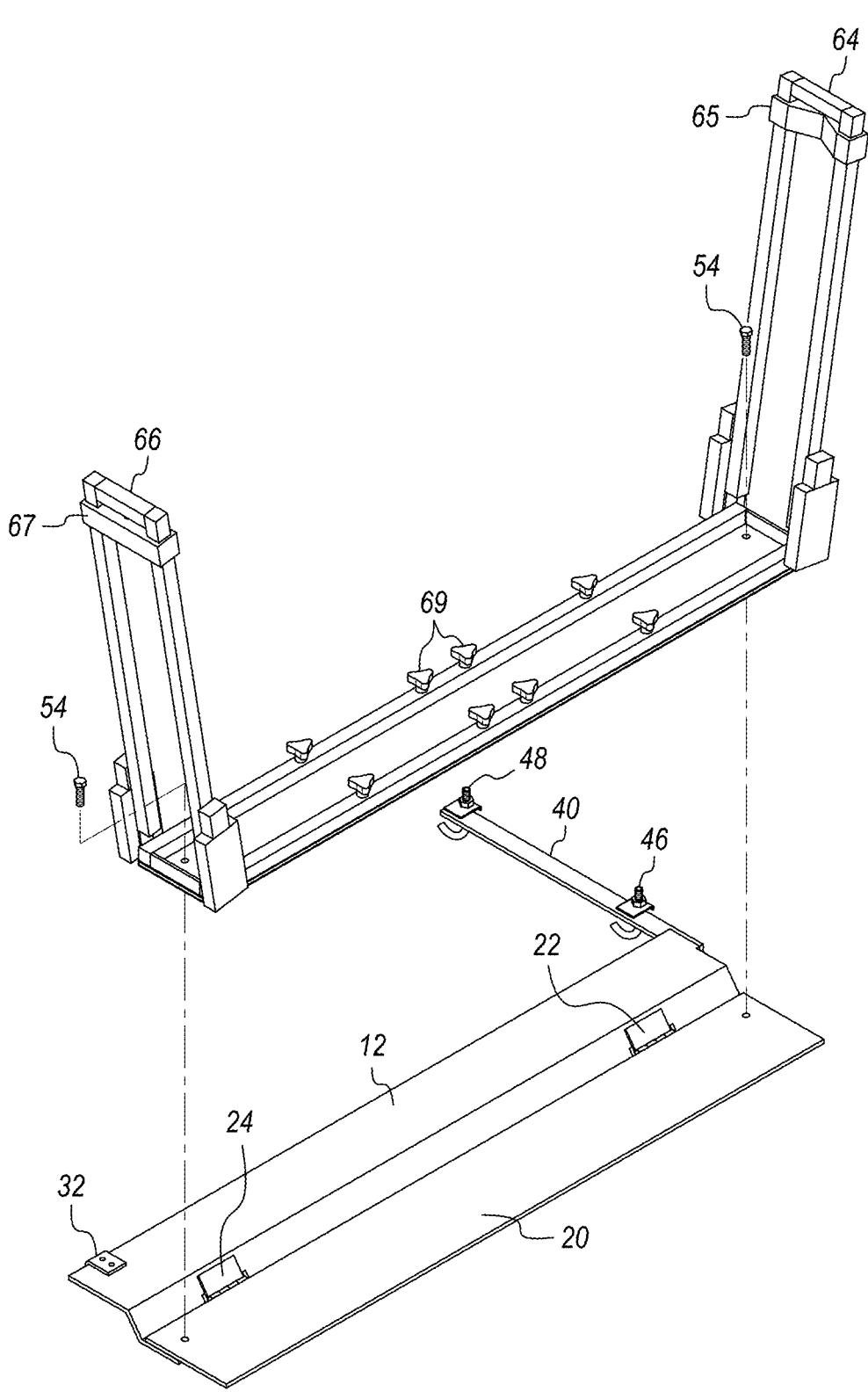
FIG. 5B is an assembly view of multi-sport rack or bike rack attached to flat adaptor plate with base plate assembly attached to T-bracket, base plate clamp bracket, first J-bolt, and second J-bolt.

In some embodiments, modular rack system for a pickup truck 5 further comprises: a flat adaptor plate 50. Flat adaptor plate 50 is a solid rigid rectangular member. Flat adaptor plate 50 is a rigid rectangular horizontal planar member or sheet of material with a plane, a front edge, a rear edge, an inner edge, an outer edge, an upper surface, a lower surface, a length, a width, a thickness, a longitudinal axis, and a latitudinal axis. Flat adaptor plate 50 has a length of about 2-10 feet. Flat adaptor plate 50 has a width of about 2-24 inches. As detailed below, the lower surface of flat adaptor plate 50 is rigidly attached to the upper surface of hinge plate 20 and the upper surface of flat adaptor plate 50 is rigidly attached to a cargo item such as: multi-sport rack, a bike rack, ski rack, snow board rack, paddle board rack, or any other type of rack. Flat adaptor plate is depicted in FIGS. 5A and 5B.

Flat adaptor plate 50 has one or more hinge plate mounting holes 52. Each one or more hinge plate mounting holes 52 is a is a circular hole or slotted hole through the flat adaptor plate 50. In best mode, there is one hinge plate mounting hole 52 adjacent to the rear edge of flat adaptor plate 50 and a second hinge plate mounting hole 52 adjacent to the front edge of flat adaptor plate 50. Each one or more hinge plate mounting holes 52 has a longitudinal axis that is perpendicular to that of flat adaptor plate 50. Each one or more hinge plate mounting holes 52 functions as a mounting hole for attachment to the hinge plate 20. Each hinge plate mounting hole 52 on the flat adaptor plate 50 must align with an adaptor plate mounting hole 26 on the hinge plate 20. One or more flat adaptor plate fasteners 54 are used to reversibly rigidly attach flat adaptor plate 50 to hinge plate 20. In best mode, there are two hinge plate mounting holes 52, two adaptor plate mounting holes 26, and two flat adaptor plate fasteners 54. Flat adaptor plate 50 also has one or more cargo mounting holes as depicted that are used to mount cargo such as a multi-sport rack or bike rack 60.

A flat adaptor plate 50 is capable of receiving and holding any item that can fit on its footprint. A flat adaptor plate 50 is capable of receiving and holding a multi-sport rack that is described in U.S. Application Ser. No. 19/073,520 entitled "MODULAR RACK SYSTEM FOR A PICKUP TRUCK", which is incorporated by reference, and is now patented. As detailed in U.S. Application Ser. No. 19/073,520, a multi-sport rack is capable of receiving and holding: a bicycle, an electric bicycle, a motorcycle, multiple snow boards, multiple skis, multiple wake boards, or similar. Multi-sport rack or bike rack 60 is mounted on a flat adaptor plate 50 as follows.

In some embodiments, modular rack system for a pickup truck 5 further comprises: a multi-sport rack or bike rack 60. Multi-sport rack or bike rack 60 comprises: an inner base rail 62; an outer base rail 63; a front stanchion assembly 64; a front ratcheting tire clamp 65; a rear stanchion assembly 66; and a rear ratcheting tire clamp 67.

Inner base rail 62 is a rigid horizontal structural member. Inner base rail 62 has a length, a width, a height, an upper surface, a lower surface, an inner surface, an outer surface, a front end, a rear end, and a longitudinal axis. The length of inner base rail 62 is longer than a bicycle's axle-to-axle distance but shorter than a bicycle's outer length dimension or tire-to-tire dimension. In best mode, inner base rail 62 is a length of square or rectangular tubing or solid material.

Outer base rail 63 is a rigid horizontal structural member. Outer base rail 63 has a length, a width, a height, an upper surface, a lower surface, an inner surface, an outer surface, a front end, a rear end, and a longitudinal axis. Outer base rail 63 is a duplicated of inner base rail 62. In best mode, outer base rail 63 is a length of square or rectangular tubing or solid material.

The lower surface of inner base rail 62 is rigidly attached to the upper surface of flat adaptor plate 50 so that the longitudinal axis of inner base rail 62 is parallel with the longitudinal axis of flat adaptor plate 50.

The lower surface of outer base rail 63 is rigidly attached to the upper surface of a flat adaptor plate 50 so that the longitudinal axis of outer base rail 63 is parallel with the longitudinal axis of flat adaptor plate 50 and the longitudinal axis of inner base rail 62. The front end of inner base rail 62 is aligned with and even with the front end of outer base rail 63. The rear end of inner base rail 62 is aligned with and even with the rear end of outer base rail 63. The distance between the outer surface of inner base rail 62 and the inner surface of outer base rail 63 is slightly larger than the width of a bicycle tire so that a bicycle tire may freely slide into this gap. Rigid attachment may be accomplished by any known means such as: weld, solder, glue, epoxy, adhesive, bolts, screws, rivets, clips, snaps, pins, or fasteners. In best mode, attachment is accomplished with eight bike rack fasteners 68 and eight bike rack nuts 69, as depicted.

Front stanchion assembly 64 comprises an inner stanchion and an outer stanchion. Inner stanchion on front stanchion assembly 64 is a rigid near vertical or upright structural member. Inner stanchion has a length, a width, a height, an upper end, a lower end, an inner surface, an outer surface, a front surface, a rear surface, and a longitudinal axis. In best mode, inner stanchion is a length of square or rectangular tubing or solid material. Outer stanchion on front stanchion assembly 64 is a rigid near vertical or upright structural member. Outer stanchion has a length, a width, a height, an upper end, a lower end, an inner surface, an outer surface, a front surface, a rear surface, and a longitudinal axis. Outer stanchion is a duplicate of inner stanchion. In best mode, outer stanchion is a length of square or rectangular tubing or solid material.

The outer surface of the lower end of inner stanchion is pivotally attached to the inner surface of the front end of inner base rail 62. The inner surface of the lower end of outer stanchion is pivotally attached to the outer surface of the front end of outer base rail 63. Pivotal attachment is such that inner and outer stanchions may be rotated to any position along a half circle and then locked into that position for rigid attachment in that position. Any know method of such pivotal attachment may be used.

The outer surface of the upper end of inner stanchion is rigidly attached to the inner surface of the upper end of outer stanchion so that the upper end of inner stanchion is even with and aligned with the upper end of outer stanchion and the longitudinal axes of inner and outer stanchions are parallel with an even continuous gap there between. This is accomplished by a structural member with a first end rigidly attached to the outer surface of the upper end of inner stanchion and a second end rigidly attached to the inner surface of the upper end of the outer stanchion.

Front stanchion assembly 64 rotates around the attachment points to inner and outer base rails 62,63, which are pivot points. Front stanchion assembly 64 may be rotated from a zero to 180 degrees between front stanchion assembly 64 and the inner and outer base rails 62,63. Thus, front stanchion assembly 64 may be rotated to zero degrees when not in use and not carrying a bicycle 120 and then all the back out to 180 degrees when mounting a bicycle 120 on the modular rack system 5.

Front ratcheting tire clamp 65 is a rigid horizontal structural member that is slidably attached to inner and outer stanchions on front stanchion assembly 64. The slidable attachment is such that front ratcheting tire clamp 65 remains perpendicular to inner and outer stanchions on front stanchion assembly 64 while it slides upwards and downwards along the lengths or longitudinal axes of inner and outer stanchions on front stanchion assembly 64. Further the slidable attachment is biased or ratcheted in that the front ratcheting tire clamp freely slides downwards but is restricted from any upward movement without first releasing a ratchet catch.

Rear stanchion assembly 66 comprises an inner stanchion and an outer stanchion. Inner stanchion on rear stanchion assembly 66 is a rigid near vertical or upright structural member. Inner stanchion has a length, a width, a height, an upper end, a lower end, an inner surface, an outer surface, a front surface, a rear surface, and a longitudinal axis. In best mode, inner stanchion is a length of square or rectangular tubing or solid material. Outer stanchion on rear stanchion assembly 66 is a rigid near vertical or upright structural member. Outer stanchion has a length, a width, a height, an upper end, a lower end, an inner surface, an outer surface, a front surface, a rear surface, and a longitudinal axis. Outer stanchion is a duplicate of inner stanchion. In best mode, outer stanchion is a length of square or rectangular tubing or solid material.

The outer surface of the lower end of inner stanchion is pivotally attached to the inner surface of the front end of inner base rail 62. The inner surface of the lower end of outer stanchion is pivotally attached to the outer surface of the front end of outer base rail 63. Pivotal attachment is such that inner and outer stanchions may be rotated to any position along the half circle and then locked into that position for rigid attachment in that position. Any know method of such pivotal attachment may be used.

The outer surface of the upper end of inner stanchion is rigidly attached to the inner surface of the upper end of outer stanchion so that the upper end of inner stanchion is even with and aligned with the upper end of outer stanchion and the longitudinal axes of inner and outer stanchions are parallel with an even gap there between. This is accomplished by a structural member with a first end rigidly attached to the outer surface of the upper end of inner stanchion and a second end rigidly attached to the inner surface of the upper end of the outer stanchion.

Rear stanchion assembly 66 rotates around the attachment points to inner and outer base rails 62,63, which are pivot points. Rear stanchion assembly 66 may be rotated from a zero to 180 degrees between rear stanchion assembly 66 and the inner and outer base rails 62,63. Thus, rear stanchion assembly 66 may be rotated to zero degrees when not in use and not carrying a bicycle 120 and then all the back out to 180 degrees when mounting a bicycle 120 on the modular rack system 5.

Rear ratcheting tire clamp 67 is a rigid horizontal structural member that is slidably attached to inner and outer stanchions on rear stanchion assembly 66. The slidable attachment is such that rear ratcheting tire clamp 67 remains perpendicular to inner and outer stanchions on rear stanchion assembly 66 while it slides upwards and downwards along the lengths or longitudinal axes of inner and outer stanchions on rear stanchion assembly 66. Further the slidable attachment is biased or ratcheted in that the rear ratcheting tire clamp freely slides downwards but is restricted from any upward movement without first releasing a ratchet catch.

Figure 8A:
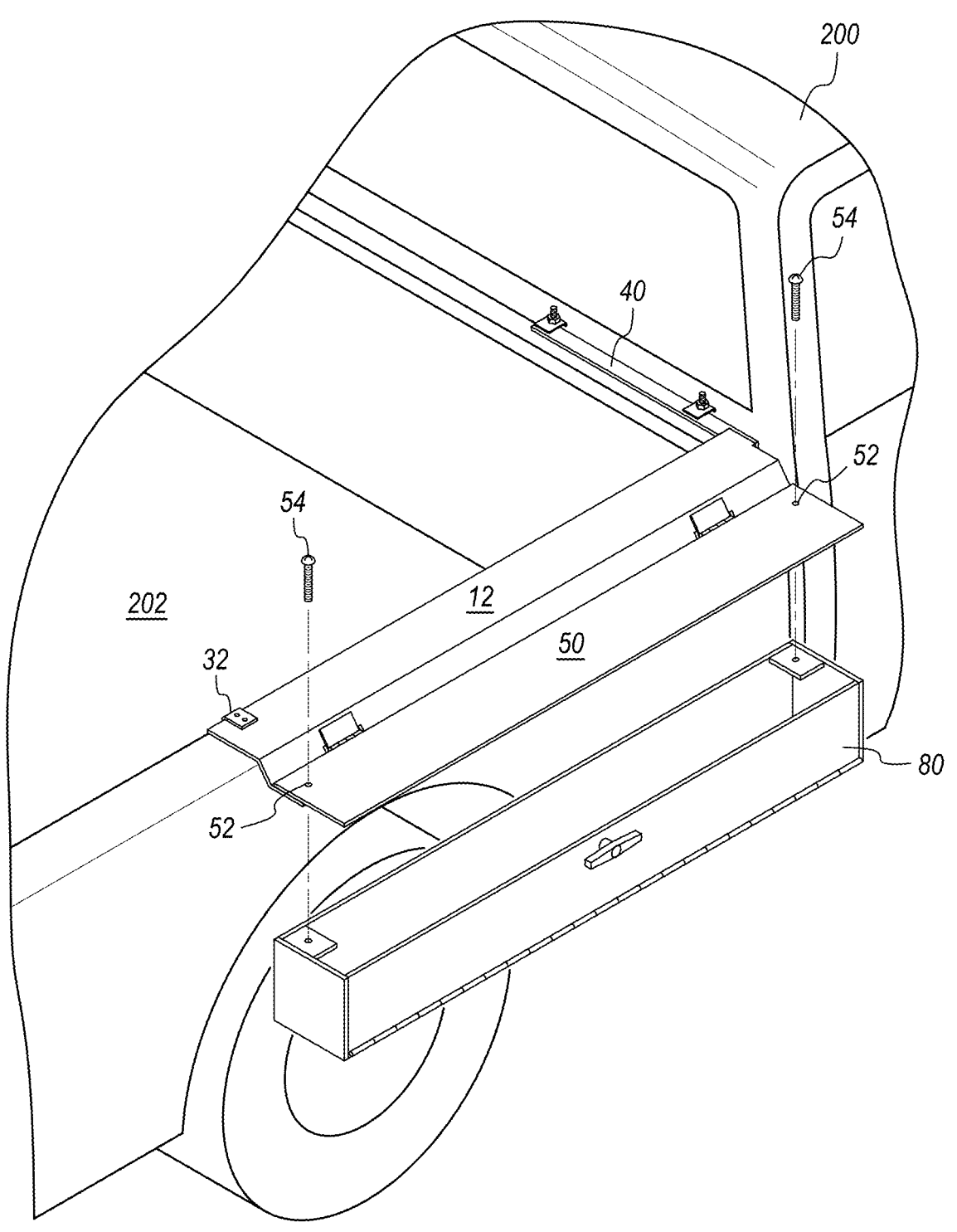
FIG. 8A is an assembly view of base plate assembly with attached T-bracket, base plate clamp bracket, first J-bolt, second J-bolt, all attached to a pickup truck bed with a tool box and two mounting fasteners.
Figure 8B:
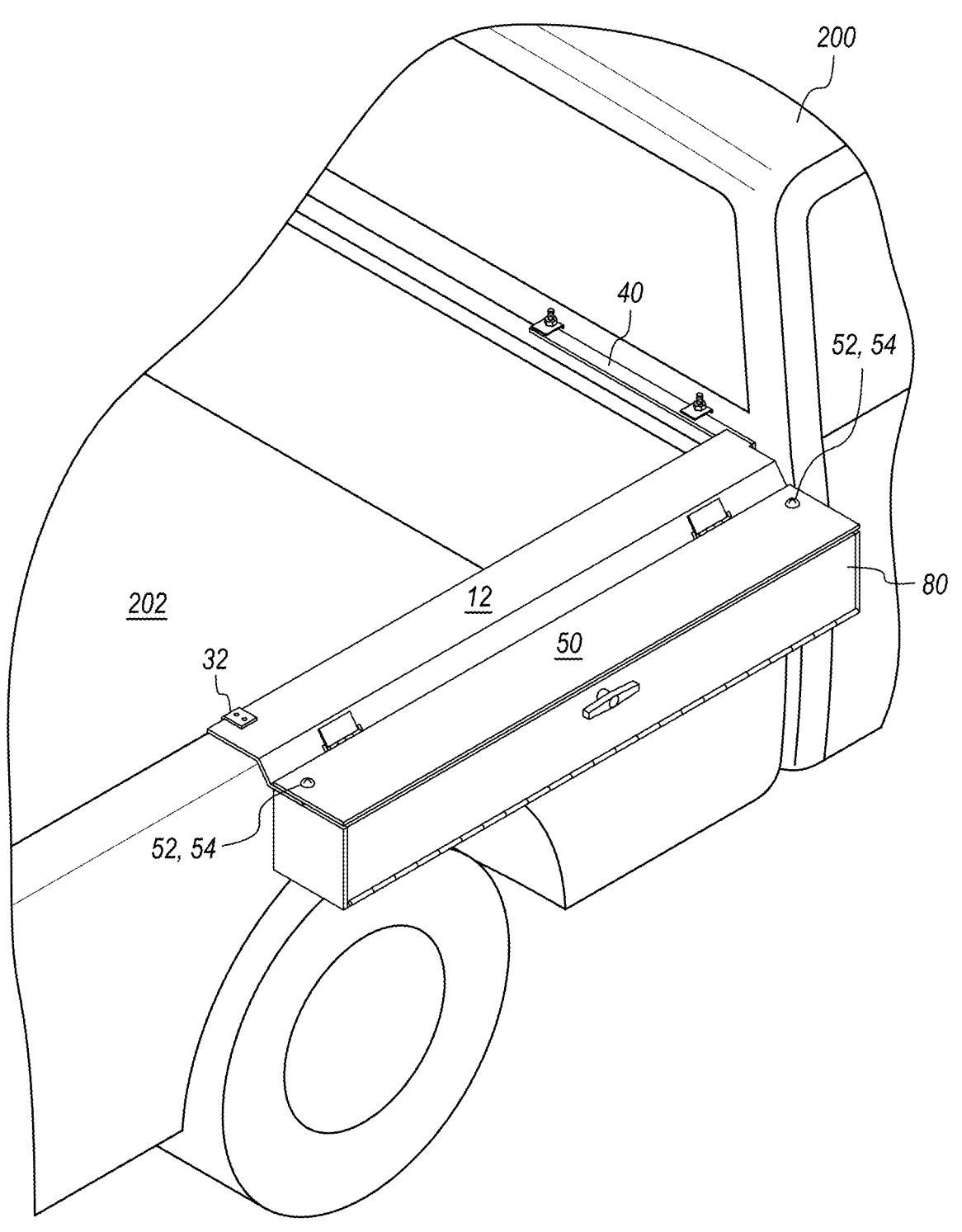
FIG. 8B is a perspective view of base plate assembly with attached T-bracket, base plate clamp bracket, first J-bolt, second J-bolt, and a tool box, all attached to a pickup truck bed with two mounting fasteners.

A flat adaptor plate 50 could also be used to attach cargo to the lower surface of flat adaptor plate 50, as depicted in FIGS. 8A and 8B. The particular tool box depicted is a front opening tool box wherein the tool box lid folds down to yield a work space or work bench on the open lid.

Figure 6A:
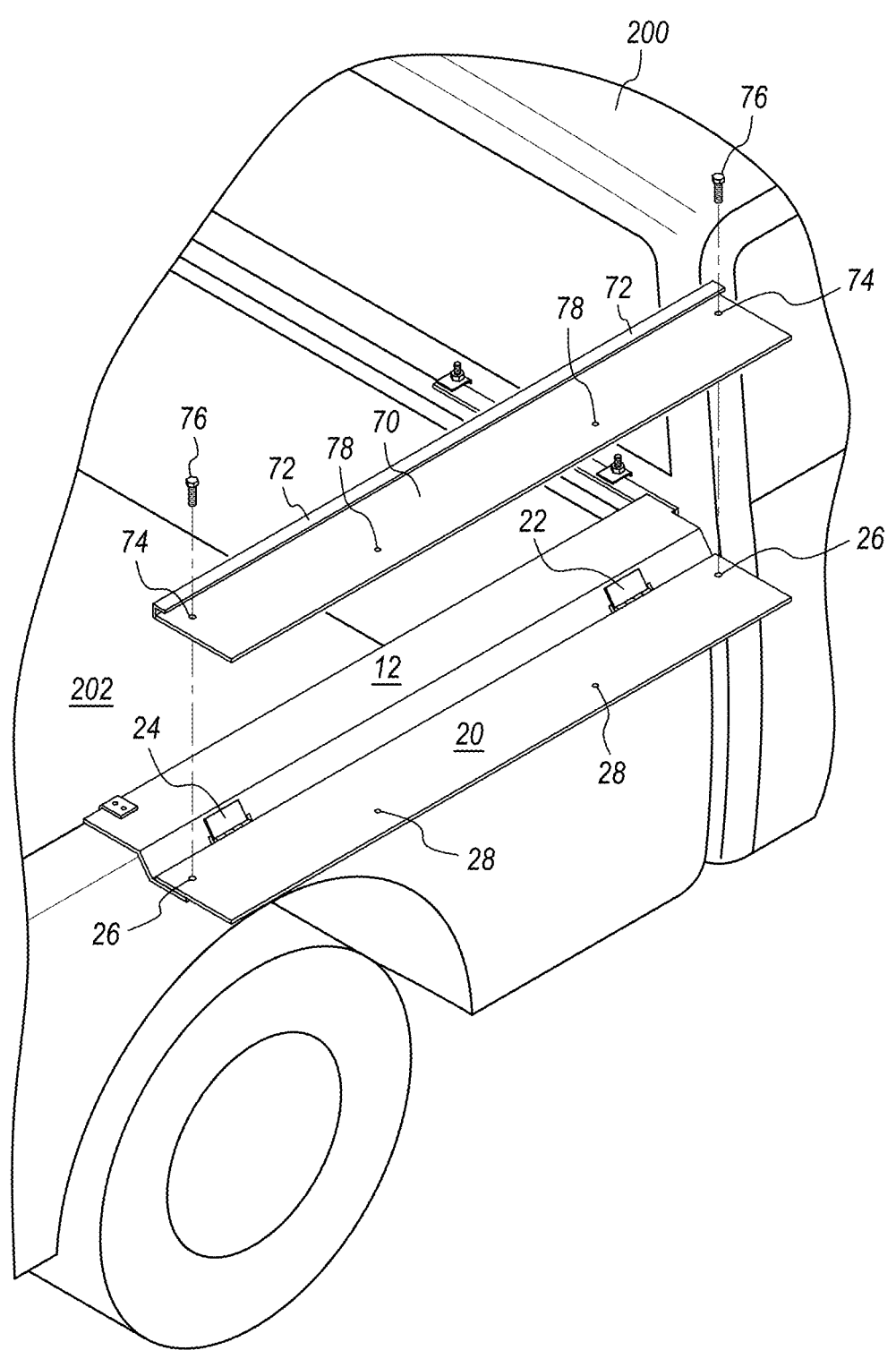
FIG. 6A is an assembly view of channeled adaptor plate and base plate assembly attached to T-bracket, base plate clamp bracket, first J-bolt, and second J-bolt, attached to a pickup truck bed.
Figure 6B:
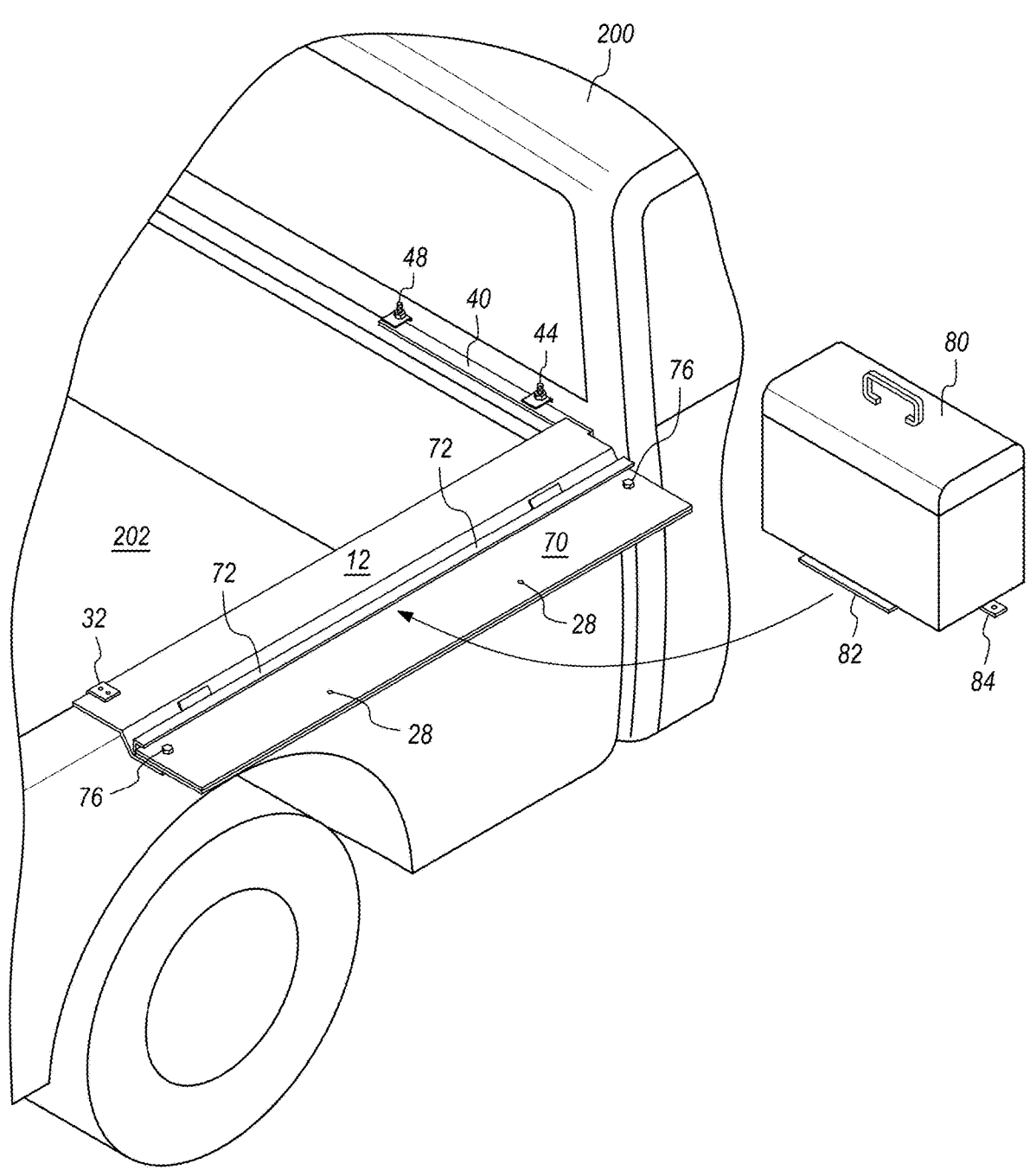
FIG. 6B is an assembly view of a tool box with attached mounting ear and locking tab with base plate assembly attached to T-bracket, base plate clamp bracket, first J-bolt, and second J-bolt, attached to a pickup truck.
Figure 6C:
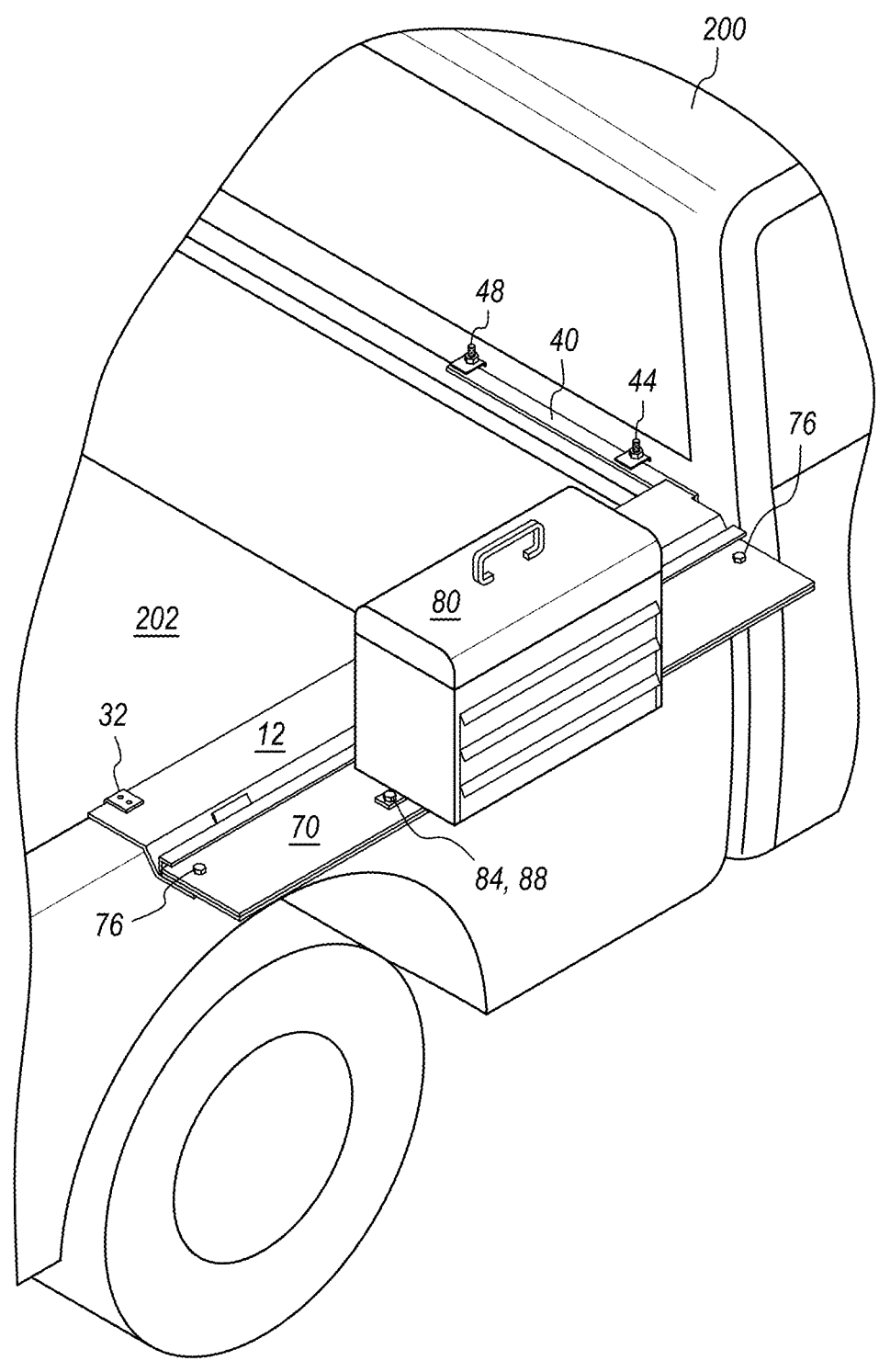
FIG. 6C is a perspective view of base plate assembly, T-bracket, base plate clamp bracket, first J-bolt, second J-bolt, and a tool box fitted with a mounting ear and a locking tab, all attached to a pickup truck bed.

Another type of adaptor plate is a channeled adaptor plate 70. In some embodiments, modular rack system for a pickup truck 5 further comprises: a channeled adaptor plate 70; one or more mounting ears 82; and one or more lacking tabs 84. Channeled adaptor plate 70 is a solid rigid rectangular member with a C-channel along one edge. Channeled adaptor plate 70 is a rigid rectangular horizontal planar member or sheet of material with a plane, a front edge, a rear edge, an inner edge, an outer edge, an upper surface, a lower surface, a length, a width, a thickness, a longitudinal axis, and a latitudinal axis. Channeled adaptor plate 70 has a length of about 2-10 feet. Channeled adaptor plate 70 has a width of about 2-24 inches. The inner edge of channeled adaptor plate 70 has a C-channel 72. A C-channel, also known as a structural channel or parallel flange channel, is a type of metal structure with a distinctive C-shaped cross-section. C-channel 72 has a flat web and two flanges extending outward that resemble the letter "C" or "U". To make the C-channel 72, the entire edge of the plate is folded or bent into a C-shaped cross section. The entire inner edge of the rigid rectangular horizontal planar member is folded in two places, a first ninety-degree bend and then a second ninety-degree bend, to form the C-channel 72, as depicted. The distance between the first ninety-degree bend and the second ninety-degree bend is similar to the thickness of a mounting ear 82 so that the mounting ear 82 has a clearance fit or slip fit within the C-channel 72. C-channel 72 functions to receive and rigidly hold one or more mounting ears 82 that have been rigidly attached to a cargo item. The lower surface of channeled adaptor plate 70 is rigidly attached to the upper surface of hinge plate 20 in order to mount the cargo on the modular rack system for a pickup truck 5. These embodiments are depicted in FIGS. 6A-6C.

Channeled adaptor plate 70 has one or more hinge plate mounting holes 74. Each one or more hinge plate mounting holes 74 is a is a circular hole or slotted hole through the channeled adaptor plate 70. In best mode, there is one hinge plate mounting hole 74 adjacent to the rear edge of channeled adaptor plate 70 and a second hinge plate mounting hole 74 adjacent to the front edge of channeled adaptor plate 70. Each one or more hinge plate mounting holes 74 has a longitudinal axis that is perpendicular to that of channeled adaptor plate 70. Each one or more hinge plate mounting holes 74 functions as a mounting hole for attachment to the hinge plate 20. Each hinge plate mounting hole 74 on the channeled adaptor plate 70 must align with an adaptor plate mounting hole 26 on the hinge plate 20. One or more channeled adaptor plate fasteners 76 are used to reversibly rigidly attach channeled adaptor plate 70 to hinge plate 20. In best mode, there are two hinge plate mounting holes 74, two adaptor plate mounting holes 26, and two channeled adaptor plate fasteners 76.

Channeled adaptor plate 70 has one or more locking tab mounting holes 78. Each one or more locking tab mounting holes 78 is a is a circular hole or slotted hole through the channeled adaptor plate 70. Each one or more locking tab mounting holes 78 has a longitudinal axis that is perpendicular to that of channeled adaptor plate 70. Each one or more locking tab mounting holes 78 functions as a mounting hole for attachment to the locking tab 84. Locking tab mounting holes 78 function to receive a mounting bolt for tool box, tool, or workbench 88 in order to help lock a tool box, tool, or workbench 80 into place on a channeled adaptor plate 70.

A channeled adaptor plate 70 is capable of receiving and holding any item that can fit on its footprint. All types of tool boxes, tools, or workbenches 80 are easily rigidly attached to the channeled adaptor plate 70 using one or more mounting ears 82 and one or more locking tabs 84.

A mounting ear 82 is a solid rigid rectangular or square member. Mounting ear 82 is a rigid rectangular horizontal planar member or sheet of material with a plane, a front edge, a rear edge, an outer edge, an inner edge, an upper surface, a lower surface, a thickness, a longitudinal axis, and a latitudinal axis. Mounting ear 82 has a length of about 0.5-4 feet. Mounting ear 82 has a width of about 2-10 inches. Mounting ear 82 has a thickness of about 0.125-2 inches. The upper surface of each mounting ear 82 is rigidly attached to the lower surface of a tool box, tool, or workbench 80 as depicted in FIGS. 6B and 6C. This rigid attachment can be accomplished by any know means. In best mode, the rigid attachment is accomplished by one or more fasteners. In best mode, one mounting ear 82 is used for each tool box, tool, or workbench 80.

All tool boxes, tools, or workbenches 80 have: a front surface, a rear surface, an upper surface, a lower surface, a left surface, and a right surface. There is a bottom front edge in between the lower surface and the front surface of all tool boxes, tools, or workbenches 80. There is a bottom rear edge in between the lower surface and the rear surface of all tool boxes, tools, or workbenches 80. There is a bottom left edge in between the lower surface and the left surface of all tool boxes, tools, or workbenches 80. There is a bottom right edge in between the lower surface and the right surface of all tool boxes, tools, or workbenches 80.

One or more mounting ears 82 are attached to the bottom rear edge of all tool boxes, tools, or workbenches 80. Each one or more mounting ears 82 is attached so that a portion of its width dimension sticks out or projects out from the bottom rear edge about 0.25-6 inches wherein the width of each mounting ear 82 extends beyond the bottom rear edge and the plane of each mounting ear 82 is horizontal, thereby creating a horizontal 0.25-6 inch tab that extends beyond the bottom rear edge of the tool box, tool, or workbench 80, as depicted. This horizontal 0.25-6-inch tab functions to engage with the C-channel 72 on channeled adaptor plate 70 in order to reversibly rigidly attach thereto. The horizontal 0.25-6-inch tab has a thickness that is designed to make a slip fit between the lower surface of the upper flange of C-channel 72 and the upper surface of the lower flange on C-channel 72, and vice versa, so that the horizontal 0.25-6-inch tab may freely slide into C-channel 72 and mate therewith but still have minimal play therebetween. So obviously the depth of the C-channel 72 must coincide or match the 0.25-6-inch dimension to allow for the proper slip-fit.

A locking tab 84 is a solid rigid rectangular or square member. Locking tab 84 is a rigid rectangular horizontal planar member or sheet of material with a plane, a front edge, a rear edge, an outer edge, an inner edge, an upper surface, a lower surface, a thickness, a longitudinal axis, and a latitudinal axis. Locking tab 84 has a length of about 2-10 inches. Locking tab 84 has a width of about 1-10 inches.

Locking tab 84 has a thickness of about 0.125-2 inches. The upper surface of each locking tab 84 is rigidly attached to the lower surface of a tool box, tool, or workbench 80 as depicted in FIGS. 6B and 6C. This rigid attachment can be accomplished by any know means.

Locking tab 84 has one or more channeled adaptor plate locking tab holes 86. Each one or more channeled adaptor plate locking tab hole 86 is a is a circular hole or slotted hole through the locking tab 84. Each one or more channeled adaptor plate locking tab hole 86 has a longitudinal axis that is perpendicular to that of locking tab 84. Each one or more channeled adaptor plate locking tab hole 86 functions as a mounting hole for attachment to a tool box, tool, or workbench 80. One or more locking tab 84 is rigidly attached to the bottom front edge, the bottom left edge, or the bottom right edge of a tool box, tool, or workbench 80 so that its hinge plate locking tab hole(s) 86 aligns with a locking tab mounting hole 78 on channeled adaptor plate 70. One or more fasteners are used to reversibly rigidly attach each locking tab 84 to the tool box, tool, or workbench 80. In best mode, one fastener is used.

A tool box, tool, or workbench 80 fitted with one or more mounting ears 82 and one or more locking tabs 84 is reversibly rigidly attached to a channeled adaptor plate 70 as follows. The horizontal 0.25-6-inch tab that extends beyond the bottom rear edge of the tool box, tool, or workbench 80 is inserted all the way into the C-channel 72. This alone prevents all vertical or up and down movement because of the precise fitment between the horizontal 0.25-6-inch tab and the C-channel 72. However, this placement does not prevent forward or reward movement as well as outward movement. The attachment of the one or more locking tabs 84 to the channeled adaptor plate 70 prevents this movement and fully secures the tool box, tool, or workbench 80 to the channeled adaptor plate 70. As stated, the tool box, tool, or workbench 80 is then positioned so that the channeled adaptor plate locking tab hole 86 is aligned with a locking tab mounting hole 78 on channeled adaptor plate 70. Then a mounting bolt or pad lock 88 is used to reversibly rigidly attach each locking tab 84 to the channeled adaptor plate 70. As stated, in best mode, one mounting ear 82, one locking tab 84, and one mounting bolt or pad lock 88 are used for each tool box, tool, or workbench 80. This procedure is reversed to remove the tool box, tool, or workbench 80 from the channeled adaptor plate 70.

In some embodiments of modular rack system for a pickup truck 5, a base plate assembly 10 is not used and is not required. Some embodiments of modular rack system for a pickup truck 5 comprise: a channeled top plate 90; one or more stake pocket toggle bolts 36; a T-bracket 40; a first J-bolt 46; a second J-bolt 48; a stanchion 100; and a stanchion brace 112.

Channeled top plate 90 is a solid rigid rectangular member with a C-channel along one edge. Channeled top plate 90 is a rigid rectangular horizontal planar member or sheet of material with a plane, a front edge, a rear edge, an inner edge, an outer edge, an upper surface, a lower surface, a length, a width, a thickness, a longitudinal axis, and a latitudinal axis. Channeled top plate 90 has a length of about 2-10 feet. Channeled top plate 90 has a width of about 2-24 inches. The inner edge of channeled top plate 90 has a C-channel 92. A C-channel, also known as a structural channel or parallel flange channel, is a type of metal structure with a distinctive C-shaped cross-section. C-channel has a flat web and two flanges extending outward, resembling the letter "C" or "U". To make the C-channel 92, the entire edge of the plate is folded or bent into a C-shaped cross section. The entire inner edge of the rigid rectangular horizontal planar member is folded in two places, a first ninety-degree bend and then a second ninety-degree bend, to form the C-channel 92, as depicted. The distance between the first ninety-degree bend and the second ninety-degree bend is similar to the thickness of a mounting ear 82 so that the mounting ear 82 has a clearance fit or slip fit within the C-channel 92. C-channel 92 functions to receive and rigidly hold one or more mounting ears 82 that have been rigidly attached to a cargo item. The lower surface of channeled top plate 90 is rigidly attached to the upper surface of hinge plate 20 in order to mount the cargo on the modular rack system for a pickup truck 5.

Channeled top plate 90 has one or more hinge plate mounting holes 94. Each one or more hinge plate mounting holes 94 is a is a circular hole or slotted hole through the channeled top plate 90. In best mode, there is one hinge plate mounting hole 94 adjacent to the rear edge of channeled top plate 90 and a second hinge plate mounting hole 94 adjacent to the front edge of channeled top plate 90. Each one or more hinge plate mounting holes 94 has a longitudinal axis that is perpendicular to that of channeled top plate 90. Each one or more hinge plate mounting holes 94 functions as a mounting hole for attachment to the hinge plate 20. Each hinge plate mounting hole 94 on the channeled top plate 70 must align with an adaptor plate mounting hole 26 on the hinge plate 20. In best mode, there are two hinge plate mounting holes 74 and two adaptor plate mounting holes 26.

Channeled top plate 90 has one or more locking tab mounting holes 96. Each one or more locking tab mounting holes 96 is a is a circular hole or slotted hole through the channeled top plate 90. Each one or more locking tab mounting holes 96 has a longitudinal axis that is perpendicular to that of channeled top plate 90. Each one or more locking tab mounting holes 96 functions as a mounting hole for attachment to the locking tab 84. Locking tab mounting holes 96 function to receive a mounting bolt for tool box, tool, or workbench 88 in order to help lock a tool box, tool, or workbench 80 into place on a channeled top plate 90.

Channeled top plate 90 further comprises: an inside wall locating flange that is exactly like inside wall locating flange 30 attached to top plate 12 discussed above except that inside wall locating flange is rigidly attached to the lower surface of channeled top plate 90 instead of top plate 12. Inside wall locating flange on channeled top plate 90 engages with the side wall of the truck bed 202 exactly as described above.

Channeled top plate 90 further comprises: a T-bracket mounting flange that is exactly like T-bracket mounting flange 14 on top plate 12 discussed above except that inside T-bracket mounting flange is on channeled top plate 90 instead of top plate 12. T-bracket mounting flange on channeled top plate 90 engages with and rigidly attaches to the base plate mounting flange 42 on T-bracket 40 exactly as described above.

T-bracket 40 is exactly as described above. The base plate mounting flange 42 on T-bracket 40 engages with and rigidly attaches to the T-bracket mounting flange on channeled top plate 90 in the exact same way that the base plate mounting flange 42 rigidly attaches to T-bracket mounting flange 14 as described above.

A channeled top plate 90 is capable of receiving and holding any item that can fit on its footprint. All types of tool boxes, tools, or workbenches 80 are easily rigidly attached to the channeled adaptor top plate 90 using one or more mounting ears 82 and one or more locking tabs 84.

As stated, embodiments with a channeled top plate 90 do not have a base plate assembly 10. Also as stated, the base assembly 10 provides substantial strength and rigidity to the rack 5 because of its special design with the top plate 12, side plate 16, and bottom plate 18. Hence, the rack 5 has less rigidity without the base plate assembly 10. To compensate for this reduction in rigidity, embodiments with a channeled top plate 90 comprise: a stanchion 100 and a stanchion brace 112.

Stanchion 100 is a rigid oblong vertical structural member. Stanchion 100 is very strong and rigid. Stanchion 100 has: a length, a width, a thickness, a lower end, an upper end, and a longitudinal axis. Stanchion brace 112 is a rigid oblong diagonal structural member. Stanchion brace 112 is very strong and rigid. Stanchion brace 112 has: a length, a width, a thickness, a lower end, an upper end, and a longitudinal axis. The lower end of stanchion 100 is rigidly attached to the outer edge of channeled top plate 90 or the upper surface of channeled top plate 90, adjacent to the outer edge of channeled top plate 90, as depicted. The upper end of stanchion 100 is rigidly attached to the upper end of stanchion brace 112. The lower end of stanchion brace 110 is rigidly attached to the front surface of T-bracket 40, adjacent to the inside end of T-bracket 40, as depicted. The longitudinal axis of stanchion brace 112 makes a 40-50 degree angle with the longitudinal axis of stanchion 100, sloping upwards toward stanchion 100 or the outside of the pickup truck. The addition of stanchion and stanchion brace adds a substantial amount of rigidity to the modular rack 5.

Figure 7A:
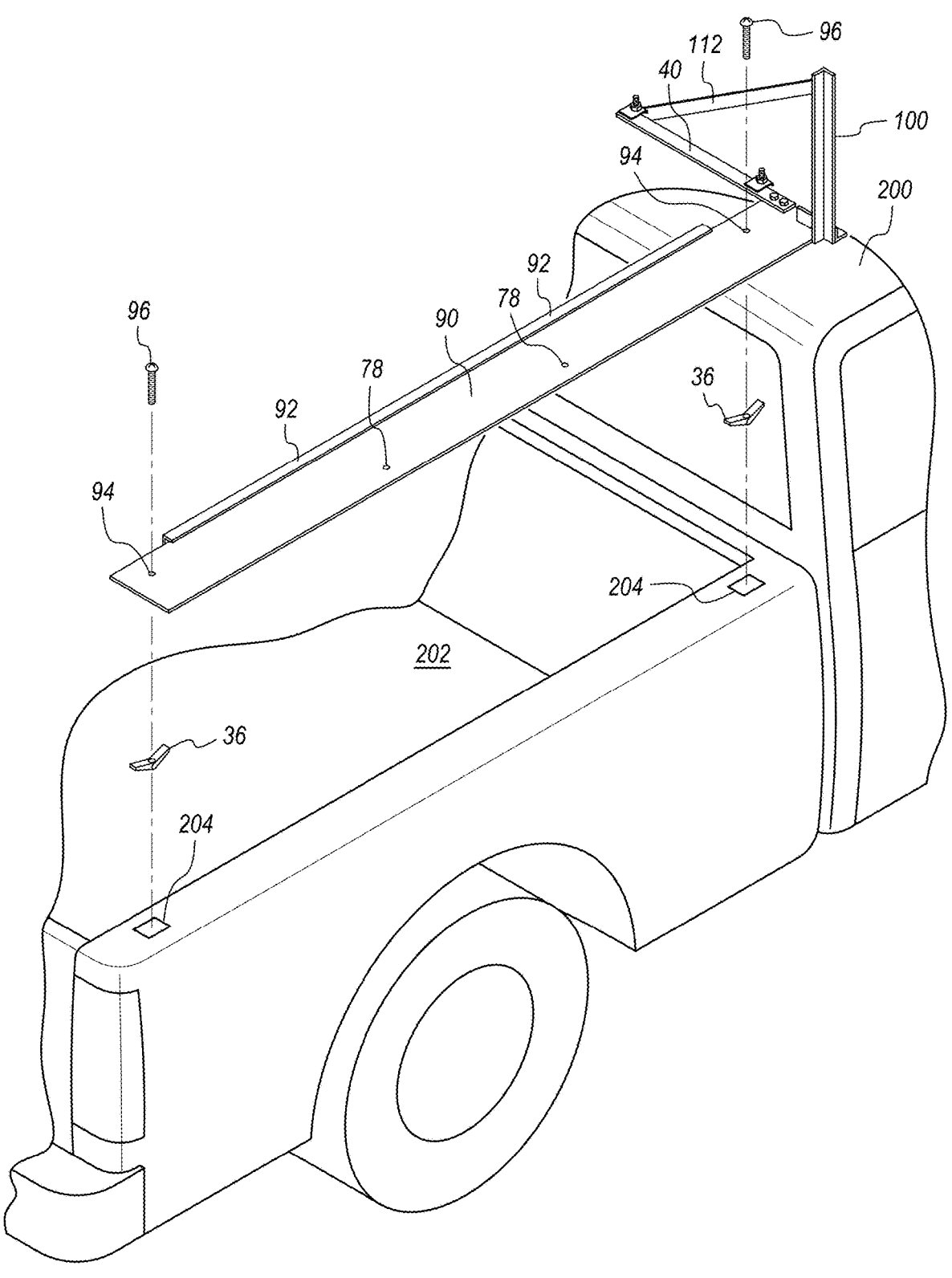
FIG. 7A is an assembly view of channeled top plate attached to a T-bracket, base plate clamp bracket, first J-bolt, second J-bolt, stanchion, and stanchion brace with a pickup truck bed and two stake pocket toggle bolts.
Figure 7B:
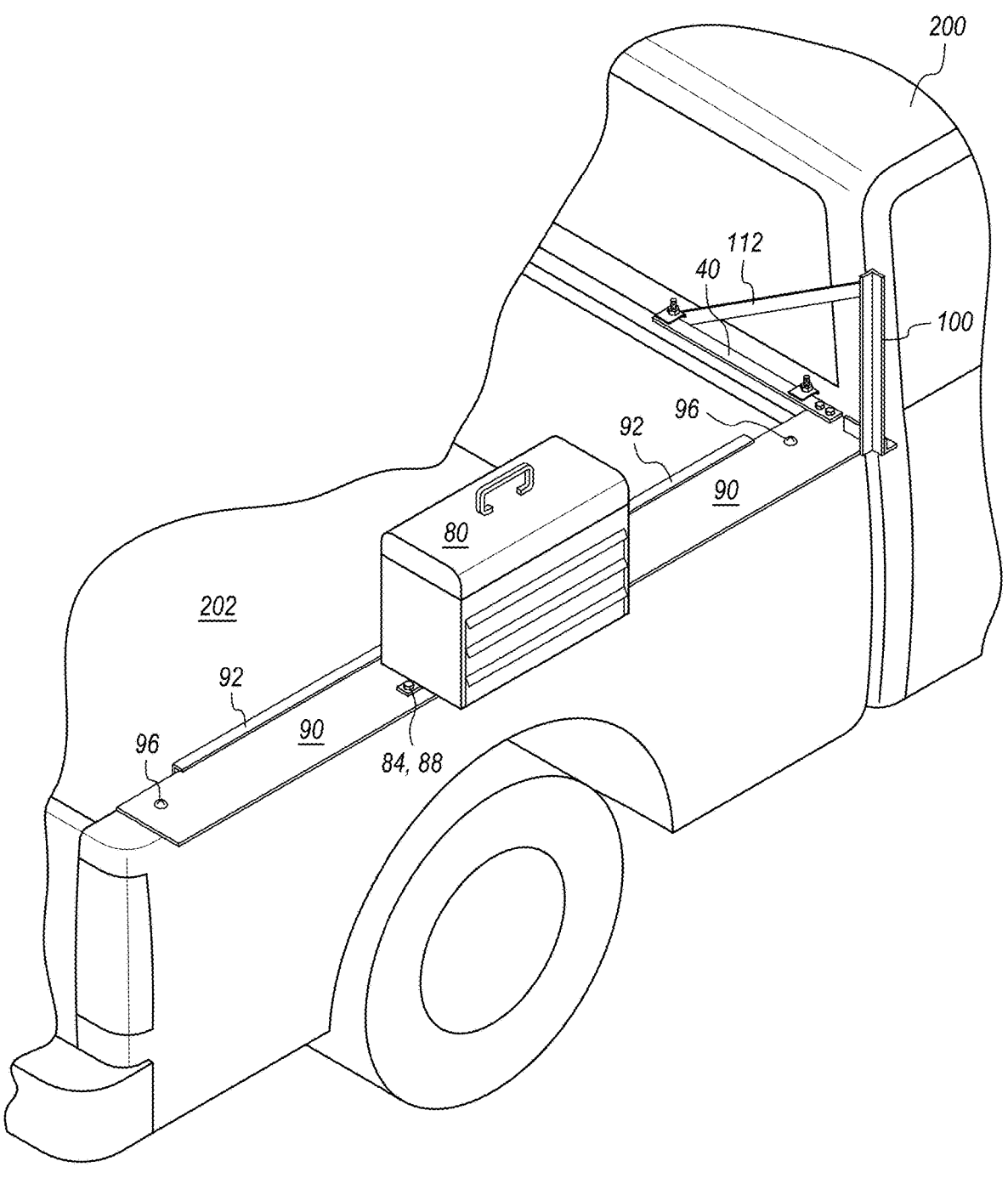
FIG. 7B is perspective view of channeled top plate attached to a T-bracket, base plate clamp bracket, first J-bolt, second J-bolt, stanchion, stanchion brace, and tool box with attached mounting ear and locking tab, all attached to a pickup truck bed with two stake pocket toggle bolts.

Modular rack system for a pickup truck 5 is reversibly rigidly attached to the pickup truck bed 202 of a pickup truck 200 without a bed shell, bed cap, or tonneau cover installed as follows. The base plate assembly 10 or the channeled top plate 90 is positioned on one side of the pickup truck bed 202 so that the rear surface of T-bracket mounting flange 14 is placed against the outside front wall of pickup truck bed 202. The outside front wall of a pickup truck bed 202 is outside wall of the pickup truck bed 202 that is located in the crack or crevice between the truck cab and the pickup truck bed 202. The rear surface of T-bracket mounting flange 14 is placed in contact with outside front wall of pickup truck bed 202, at the top of the pickup truck bed 202, as depicted. At the same time, the outer surface of the inside wall locating flange is simultaneously positioned against the inside side wall of the pickup truck bed 202, as depicted. At the same time, the C-shaped frame of base plate clamp bracket 32 is placed around the inside side wall of the pickup truck bed 202 so that the C-shaped frame can clamp onto the inside side wall of the pickup truck bed 202, as depicted in FIGS. 4B and 4B. Alternately, instead of a base plate clamp bracket 32, one or more stake pocket toggle bolts 36 may be used to clamp onto the side wall of the pickup truck bed 202, as depicted in FIGS. 7A and 7B. The base plate assembly 10 or the channeled top plate 90 is held in this position, and then the base plate clamp bracket 32 is tightened by tightening base plate clamp bracket bolt or screw 34 to clamp onto the side wall of the pickup truck bed 202, or the one or more stake pocket toggle bolts 36 to clamp onto the side wall of the pickup truck bed 202. Then the T-bracket is positioned on top of the front wall of the pickup truck bed 202 with its longitudinal axis parallel with that of the front wall of the pickup truck bed 202 and with the base plate mounting flange 42 aligned with the T-bracket mounting flange 14 on top plate 12. Then one or more base plate mounting bolts 43 are installed into the one or more holes on base plate mounting flange and the one or more holes on T-bracket mounting flange 14 by inserting the threaded ends of the one or more base plate mounting bolts 43 into these holes but without tightening the bolts at this time. Next, first J-bolt 46 is inserted into the hole on first T-bracket clamp tab 44. Next, second J-bolt 48 is inserted into the hole on second T-bracket clamp tab 45. Care must be taken to ensure that the J-hooks on first and second J-bolts 46,48 are in position to catch or latch onto the outer lip of the pickup truck bed 202. Then, the T-bracket 40 is pressed firmly backwards and held to contact the front wall of the pickup truck bed 202, and then first and second J-bolts 46,48 are attached by tightening the nut on each J-bolt 56,48 to rigidly attach T-bracket 40 to the pickup truck bed 202. Next, the one or more base plate mounting bolts 43 are tightened to rigidly attach the T-bracket 40 to the base plate assembly 10. Tightening these bolts after tightening the two J-bolts 46,48 allows the T-bracket 40 exactly match or coincide with the exact angle of the pickup truck bed 202, thereby allowing for more rigid attachment to the pickup truck bed 202. Next, in the case of the channeled top plate 90, the stanchion 100 and the stanchion brace 112 are installed as described above.

Modular rack system for a pickup truck 5 is reversibly rigidly attached to the bed 202 of a pickup truck 200 with a bed shell, bed cap, or tonneau cover installed as follows. The bed shell, bed cap, or tonneau cover is first removed from the bed 202 of a pickup truck 200. Then, the modular rack system for a pickup truck 5 is placed onto the bed 202 of a pickup truck 200 and positioned properly. Then, the bed shell, bed cap, or tonneau cover is placed on the bed 202 of a pickup truck 200 and on top of the upper surface of top plate 12. Then, the standard OEM clamps from the bed shell, bed cap, or tonneau cover are installed with the base plate assembly 10 and T-bracket 40 in between the bed shell, bed cap, or tonneau cover and the bed 202 of a pickup truck 200. Base plate assembly 10 and T-bracket 40 are designed to have a very low profile or low thickness but still remain sturdy and rigid. Finally, the standard OEM clamps from the bed shell, bed cap, or tonneau cover are tightened to the standard torque recommended by the bed shell, bed cap, or tonneau cover. The base plate assembly 10 and T-bracket 40 are thin enough to allow for the bed shell, bed cap, or tonneau cover to be installed right on top without interfering with the bed shell, bed cap, or tonneau cover in any way. The base plate assembly 10 and T-bracket 40 do not interfere with the standard OEM clamps of the bed shell, bed cap, or tonneau cover. The standard OEM clamps of the bed shell, bed cap, or tonneau cover still function as designed to rigidly attach the bed shell, bed cap, or tonneau cover to the bed 202, even with the base plate assembly 10 and T-bracket 40 lying in-between the bed shell, bed cap, or tonneau cover to the bed.

What is claimed:

1. A modular rack system for a pickup truck comprising: a channeled top plate; a T-bracket; a stanchion; and a stanchion brace, wherein, said channeled top plate is a rigid rectangular horizontal planar member or sheet of material with a plane, a front edge, a rear edge, an inner edge, an outer edge, an upper surface, a lower surface, a length, a width, a thickness, a longitudinal axis, and a latitudinal axis, said inner edge of said channeled top plate has a C-channel that is a structural channel or a parallel flange channel with a C-shaped cross-section, said C-channel has a flat web with a set of two outwardly extending flanges said channeled top plate has one or more hinge plate mounting holes, said channeled top plate has one or more locking tab mounting holes, said channeled top plate is reversibly rigidly attachable to a bed of a pickup truck, said upper surface of said channeled top plate is reversibly rigidly attachable to a cargo item, said channeled top plate has a T-bracket mounting flange that is a rectangular or square extension or ear projecting downward from said front edge of said top plate, wherein said T-bracket mounting flange has one or more mounting holes, said channeled top plate has an inside wall locating flange that is an oblong rigid planar member or bi-planar member, said inside wall locating flange has a tab, flap, or projection that extends perpendicularly downward from said lower surface of said top plate, said T-bracket is a length of rigid biplanar angular material, angle iron, or angle steel, said T-bracket has a rigid horizontal planar member with a length, a width, a height, a longitudinal axis, an inside end, an outside end, an upper surface, a lower surface, a front surface, and a rear surface, said T-bracket has a rigid vertical planar member with a length, a width, a height, a longitudinal axis, an inside end, an outside end, an upper surface, a lower surface, a front surface, and a rear surface, 6 said inside surface of said rigid vertical member is rigidly attached to said T-bracket mounting flange on said channeled top plate, said T-bracket is reversibly rigidly attachable to said bed of said pickup, said stanchion is a rigid oblong vertical structural member with a length, a width, a thickness, a lower end, an upper end, and a longitudinal axis, said stanchion brace is a rigid oblong diagonal structural member with a length, a width, a thickness, a lower end, an upper end, and a longitudinal axis, said lower end of said stanchion is rigidly attached to said outer edge of said channeled top plate or said upper surface of said channeled top plate, adjacent to said outer edge of said channeled top plate, said upper end of said stanchion is rigidly attached to said upper end of said stanchion brace, said lower end of said stanchion brace is rigidly attached to said front surface of said T-bracket, adjacent to said inside end of said T-bracket, and said longitudinal axis of said stanchion brace forms a 40-50 degree angle with said longitudinal axis of said stanchion.

* * * * *